United States Patent
Osann, Jr.

(10) Patent No.: US 8,102,868 B2
(45) Date of Patent: Jan. 24, 2012

(54) INTERLEAVED AND DIRECTIONAL WIRELESS MESH NETWORK

(75) Inventor: Robert Osann, Jr., Cupertino, CA (US)

(73) Assignee: Folusha Forte B.V., LLC, Dover, DE (US)

( * ) Notice: Subject to any disclaimer, the term of this patent is extended or adjusted under 35 U.S.C. 154(b) by 1057 days.

(21) Appl. No.: 11/507,921

(22) Filed: Aug. 22, 2006

(65) Prior Publication Data

US 2007/0153817 A1  Jul. 5, 2007

Related U.S. Application Data

(60) Provisional application No. 60/756,794, filed on Jan. 5, 2006.

(51) Int. Cl.
*H04L 12/28* (2006.01)
*H04L 12/56* (2006.01)

(52) U.S. Cl. .......................................................... 370/406

(58) Field of Classification Search .................. None
See application file for complete search history.

(56) References Cited

U.S. PATENT DOCUMENTS

| | | | |
|---|---|---|---|
| 2,892,930 A * | 6/1959 | Magnuski et al. ............... 455/10 |
| 6,005,884 A | 12/1999 | Cook et al. |
| 6,067,290 A | 5/2000 | Paulraj et al. |
| 6,363,062 B1 | 3/2002 | Aaronson et al. |
| 6,539,002 B1 * | 3/2003 | Arnold ........................... 370/295 |
| 6,597,919 B1 | 7/2003 | Kumar et al. |
| 6,665,536 B1 | 12/2003 | Mahany |
| 6,697,013 B2 | 2/2004 | McFarland et al. |
| 6,701,137 B1 | 3/2004 | Judd et al. |
| 6,704,301 B2 | 3/2004 | Chari et al. |
| 6,718,159 B1 * | 4/2004 | Sato ............................ 455/11.1 |
| 6,816,706 B1 | 11/2004 | Hohnstein et al. |
| 6,912,204 B2 | 6/2005 | Kossi et al. |
| 6,925,069 B2 | 8/2005 | Koos, Jr. et al. |
| 6,931,261 B2 | 8/2005 | Waylett et al. |
| 6,996,086 B2 | 2/2006 | Wolfe |
| 7,012,895 B1 | 3/2006 | Mir |
| 7,031,293 B1 | 4/2006 | Srikrishna et al. |
| 7,064,119 B2 | 6/2006 | Wolfe et al. |

(Continued)

OTHER PUBLICATIONS

International Search Report and Written Opinion for PCT/US07/77908, dated Mar. 17, 2008, 8 pages.

(Continued)

*Primary Examiner* — Chirag Shah
*Assistant Examiner* — Minh-Trang Nguyen
(74) *Attorney, Agent, or Firm* — Schwabe, Williamson & Wyatt, P.C.

(57) ABSTRACT

A directional and interleaved wireless mesh network is described where mesh nodes have directional antennas facing in horizontally orthogonal directions. The antennas can be focused to have a beam width of less than ninety degrees in order to achieve greater strength of signal and radiation. Each mesh node can have two radios that communicate on separate channels, such that packets propagated through the mesh network can utilize either channel in order to hop from one node to the next. Each radio can be connected to four orthogonally directed antennas in order to enable communication with adjacent nodes. Alternatively, a separate independent radio can be connected to each antenna in order to achieve greater simultaneity of transmission and reception to the node. For example, two such radio-antenna combinations can be facing in each of the four orthogonal directions, each of the two combinations operating on a different RF channel.

20 Claims, 20 Drawing Sheets

Interleaved Wireless Mesh Network

- All mesh nodes always have access to both meshes
- Packet propagation scheme relies on this

U.S. PATENT DOCUMENTS

| | | | |
|---|---|---|---|
| 7,362,737 B2 | 4/2008 | Behroozi | |
| 2002/0145567 A1* | 10/2002 | Spiegel et al. | 343/700 MS |
| 2002/0159409 A1 | 10/2002 | Wolfe et al. | |
| 2002/0167954 A1 | 11/2002 | Highsmith et al. | |
| 2002/0176440 A1 | 11/2002 | Hammel et al. | |
| 2002/0181427 A1 | 12/2002 | Sparr et al. | |
| 2003/0002513 A1 | 1/2003 | Bernheim et al. | |
| 2003/0040335 A1 | 2/2003 | McIntosh et al. | |
| 2003/0109217 A1 | 6/2003 | Reed et al. | |
| 2003/0109285 A1 | 6/2003 | Reed et al. | |
| 2003/0152086 A1 | 8/2003 | El Batt | |
| 2003/0185169 A1 | 10/2003 | Higgins | |
| 2004/0001442 A1 | 1/2004 | Rayment et al. | |
| 2004/0077310 A1 | 4/2004 | Levy | |
| 2004/0090943 A1 | 5/2004 | DaCosta et al. | |
| 2004/0095907 A1 | 5/2004 | Agee et al. | |
| 2004/0114546 A1 | 6/2004 | Seshadri et al. | |
| 2004/0137924 A1 | 7/2004 | Herscovich et al. | |
| 2004/0263390 A1 | 12/2004 | Merenda et al. | |
| 2005/0030968 A1 | 2/2005 | Rich et al. | |
| 2005/0036505 A1 | 2/2005 | Frei et al. | |
| 2005/0059342 A1* | 3/2005 | Engels et al. | 455/7 |
| 2005/0074019 A1 | 4/2005 | Handforth et al. | |
| 2005/0152314 A1 | 7/2005 | Sun et al. | |
| 2005/0163144 A1 | 7/2005 | Srikrishna et al. | |
| 2005/0185606 A1 | 8/2005 | Rayment et al. | |
| 2005/0232179 A1* | 10/2005 | daCosta et al. | 370/315 |
| 2005/0286448 A1* | 12/2005 | Proctor et al. | 370/279 |
| 2006/0056442 A1 | 3/2006 | DaCosta et al. | |
| 2006/0083186 A1 | 4/2006 | Handforth et al. | |
| 2006/0114881 A1 | 6/2006 | Chari et al. | |
| 2007/0053295 A1* | 3/2007 | Cleveland et al. | 370/235 |
| 2007/0121648 A1* | 5/2007 | Hahn | 370/401 |
| 2008/0247310 A1 | 10/2008 | Ruffini et al. | |

OTHER PUBLICATIONS

Rappaport, T., *Wireless Communications: Past Events and a Future Perspective*, IEEE Communications Magazine, May 2002, pp. 148-161.

*Cellular Backhaul Using Wireless Mesh Topologies*, InterWave White Paper, 2002, pp. 1-10.

eWeek, *D-Link Wireless Access Point Features Power Over Ethernet*, 2004 (1page).

Final Office Action, mailed Jan. 6, 2010, for U.S. Appl. No. 11/592,805.

Final Office Action, mailed Dec. 12, 2009, for U.S. Appl. No. 11/503,036.

Office Action, mailed Jun. 10, 2009, for U.S. Appl. No. 11/503,036.

Office Action, mailed Jul. 7, 2009, for U.S. Appl. No. 11/592,805.

Office Action, mailed Jul. 7, 2009, for U.S. Appl. No. 11/516,995.

Advisory Action, mailed Mar. 29, 2010, for U.S. Appl. No. 11/592,805, 3 pages.

Office Action, mailed Apr. 7, 2010, for U.S. Appl. No. 11/516,995, 12 pages.

Search Report, mailed Jul. 14, 2006 for application PCT/US2005/036819.

Office Action, mailed Oct. 16, 2008 for U.S. Appl. No. 11/516,995.

Office Action, mailed Feb. 5, 2009 for U.S. Appl. No. 11/516,995.

Search Report, mailed Mar. 10, 2009 for application PCT/US2007/077908.

Office Action, mailed May 26, 2010, for U.S. Appl. No. 11/503,036, 19 pages.

Office Action, mailed Jun. 9, 2010, for U.S. Appl. No. 11/592,805, 24 pages.

Final Office Action for U.S. Appl. No. 11/592,805, mailed Dec. 9, 2010, 21 pages.

Final Office Action for U.S. Appl. No. 11/516,995, mailed Oct. 5, 2010, 14 pages.

Final Office Action for U.S. Appl. No. 11/503,036, mailed Dec. 9, 2010, 24 pages.

Office Action, issued in U.S. Appl. No. 11/516,995, mailed Mar. 21, 2011, 17 pages.

* cited by examiner

Prior Art Mesh Networks
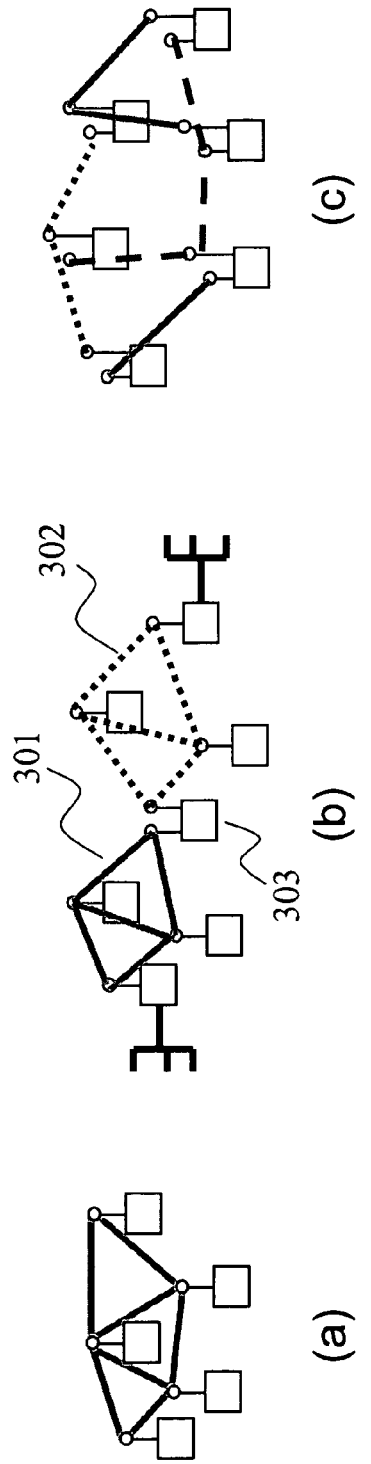
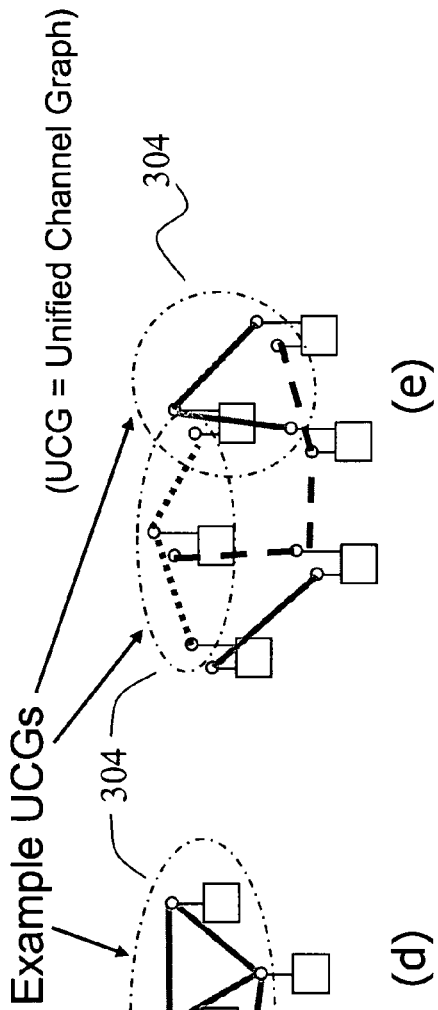
Fig 3

INTERLEAVED AND DIRECTIONAL WIRELESS MESH NETWORK

CLAIM OF PRIORITY

This application claims the benefit and priority of U.S. Provisional Application Ser. No. 60/756,794, filed on Jan. 5, 2006, and entitled "DIRECTIONAL AND INTERLEAVED WIRELESS MESH NETWORKS," commonly assigned with the present application and incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS REFERENCES TO RELATED APPLICATIONS

This application is related to and cross references the following U.S. patent applications, which are incorporated herein by reference:
U.S. patent application Ser. No. 11/503,036 entitled "INTERLEAVED WIRELESS MESH NETWORK," by Robert Osann, Jr., filed on Aug. 11, 2006.
U.S. patent application Ser. No. 11/516,995 entitled "SYNCHRONIZED WIRELESS MESH NETWORK," by Robert Osann, Jr., filed on Sep. 7, 2006.
U.S. patent application Ser. No. 11/592,805 entitled "COMBINED DIRECTIONAL AND MOBILE INTERLEAVED WIRELESS MESH NETWORK," by Robert Osann, Jr., filed on Nov. 3, 2006.

FIELD OF THE INVENTION

The invention relates generally to the field of wireless mesh networks for public safety and general public access applications.

BACKGROUND OF THE INVENTION

Typical wireless mesh networks use a single radio for the backhaul or relay function where packets are moved through the mesh from node to node. This causes a significant bandwidth limitation since a single radio cannot send and receive at the same time. Adding relay radios at individual mesh nodes can enable a mesh node to simultaneously send and receive packets, thereby increasing the overall rate of bandwidth propagation through the mesh node. The simplest form of prior art mesh network is the ad hoc mesh network shown in FIG. 1(a), where each mesh node 101 contains a relay radio 102. This is the most elemental form of wireless mesh network and originated in the military. It was characteristic of these networks that all mesh nodes have a single radio and all radios operate on the same channel or frequency.

Note that in this specification, the term "channel" is most often used to mean a specific RF frequency or band of frequencies. However, the term "channel" is to be understood in a generalized sense as designating a method of isolating one data transmission from others such that they do not interfere. While this differentiation or isolation may be accomplished by utilizing different frequencies, it may also be accomplished by choosing different RF wave polarizations or in the case of a TDMA scheme, it may refer to different time slots in a time division scheme. For CDMA systems, isolation of transmissions may result from having different spreading codes. Regardless, channelization is a method for making efficient use of available spectrum and preventing interference between different transmissions that otherwise might interfere with each other.

One evolution of the early ad hoc mesh network form is shown in FIG. 1(b) where relay radio 103 is capable not only of transferring packets to adjacent nodes, but is also capable of operating as an access point (AP) as well, providing service (typically WiFi) to client devices such as laptop computers, wireless PDAs, and WiFi VoIP phones.

The architecture of FIG. 1(b) suffers from performance limitations since the single radio must not only relay packets, but also service numerous client radios 104 at each node. Thus, another evolution was developed as shown in FIG. 1(c), where each mesh node has a separate service or AP radio 105 in addition to relay radio 106. This allows client devices 107 to communicate with service radio 105 on a different channel or frequency than relay radio 106, thereby reducing interference effects within the mesh and increasing performance.

A more recent evolution of mesh architectures is shown in FIG. 1(d) where relay radios 108 and 109 are used at each mesh node along with a separate service radio 110. Here, packets can be received on relay radio 108 while simultaneously being transmitted on relay radio 109, and vice versa, thereby increasing performance due to both the simultaneous operation of both radios, as well as the fact that radios 108 and 109 typically operate on different channels, thereby further reducing interference effects in the mesh. It is also known to add radios to the architecture shown in FIG. 1(d) such that there would be two relay radios for uplink replacing relay radio 108, and two relay radios for downlink replacing relay radio 109. This addition effectively doubles the bandwidth and enables full-duplex (simultaneous uplink and downlink) operation, however a specific packet stream will propagate through only one of a pair of uplink or downlink radios. Thus, the maximum performance of such a link between two nodes will only be realized in situations where traffic loading is high. The absolute performance of a single stream of packets will not be increased beyond what a single link could deliver.

While FIG. 1 shows the architectures for various prior art mesh networks in a one-dimensional form for sake of simplicity, FIG. 2 elaborates on the architecture of FIG. 1(d) showing a two-dimensional view. In the 3-radio mesh of FIG. 2, also known as a "structured" mesh, a tree-like structure is formed emanating from a root node 201 which connects directly to a wired network 202. This wired network can, in turn, connect to the Internet or alternatively, it may connect simply to a server. In the case of a public safety network, the wired network will often connect to the Command and Control center. It is characteristic of this type of mesh that, at every hop, packets being relayed travel on a different channel from the previous hop. Thus RF transmissions, 202, 203, and 204 which connect mesh node 201a with mesh nodes 205, 206, and 207, operate on three different channels or frequencies as shown by the different styles of dotted line. In this type of mesh network, the mesh control software on each node has a significant challenge in assigning the various available channels throughout the mesh such that interference effects are minimized, and the mesh functions properly. Some mesh network vendors rely on customers to manually assign channels as the units are being installed. Other mesh vendors have developed very elaborate dynamic channel assignment software programs, which perform this function automatically. Either way, having a mesh network where channels change from hop to hop is complicated and difficult to deal with. In the case of a public safety mesh with mobile nodes (for vehicles and individual First Responders on foot), a further problem arises with this form of mesh. For instance, if a group of first responders each carrying a mesh node become isolated from the backhaul connection to the server (Command and Control), the tree-like structure of FIG. 2 may become compromised since there is no longer a defined root for the tree. It is important for isolated groups of first responders, with nodes that are vehicle mounted, man-carried, or both, to continue communicating amongst themselves when isolated until the connection to Command and Control is restored.

FIG. 3 shows example channel configurations in a WLAN Mesh from section 4.2.3 of IEEE 802.11-06/0328r0, the Combined Proposal for the ESS Mesh Standard (published in March 2006). It should be noted that the publication referenced here post dates the filing of U.S. Provisional Application Ser. No. 60/756,794 to which the present application claims priority. However, in the event that this information had been published in previous submittals at prior IEEE standards meetings, and also for purposes of clarity, the information in this publication is being described herein. FIG. 3(a) shows a simple ad hoc mesh, while FIG. 3(b) shows two ad hoc meshes, 301 and 302, which are bridged by central mesh node 303 having two radios. FIG. 3(c) shows a number of mesh nodes, each having two radios for packet relay, which for the most part are being utilized in a manner similar to the "structured" mesh of FIG. 2. FIG. 3(c) also demonstrates the concept of nodes with 2-radio relays being used to bridge between one sub-mesh and another. This referenced proposal for a new mesh standard also discusses the concept of Unified Channel Graphs or UCGs. In FIGS. 3(d) and 3(e), notice that FIGS. 3(b) and 3(c) are replicated with superimposed circles 304 indicating nodes which communicate with each other on a particular channel. Essentially FIG. 3(e) demonstrates a number of sub-meshes which are bridged by mesh nodes, each bridging node containing two relay radios. One can easily imagine the challenge in assigning channels to the network demonstrated in FIGS. 3(c) and 3(e). Also, when connections between nodes must change because of a node failure, temporary disturbances to the mesh (moving obstacles or radar interference), node movement, or QOS considerations, there can be a ripple effect of changing channels causing even greater complexity.

FIG. 4 shows the architecture for the only mesh network solution that currently supports both public safety and public access, and is being sold by Motorola. Here, there are two completely separate mesh systems embodied in the same enclosure 401. Each enclosure has two radios 402 for public safety and two radios 403 for public access. Each of these separate meshes functions as a "1+1" mesh as demonstrated in FIG. 1(c) by radio elements 105 and 106. This vendor has chosen to make the public access radios utilize 2.4 GHz for both relay and service, with 4.9 GHz being utilized for the public service radios (relay and service). Each of these meshes is separate from the other with no interaction. In particular, packet traffic on the 4.9 GHz mesh may only be used for public service as governed by law—public access traffic may never utilized 4.9 GHz. Thus, this prior art solution addresses the problem that it is desirable to reduce the number of mesh unit enclosures that must be mounted at strategic locations to cover a metropolitan area. However, the solution does not integrate any additional functionality beyond what is shown in FIG. 4, and from a performance standpoint, each of the two individual mesh networks embodied here will have the performance restrictions of other prior art mesh architectures constructed according to FIG. 1(c).

It would therefore be desirable to have a wireless mesh network architecture with the performance characteristics provided by a 2-radio relay, without the complexity of managing multiple and dynamically changeable channels, which can change from hop-to-hop.

The majority of mesh nodes being installed today use omnidirectional antennas for the relay or backhaul function to transfer packets between mesh nodes. While some mesh vendors claim to have installed mesh networks in hundreds of cities, all but a few of these are suburban towns, not large cities with tall buildings. In fact, none of the mesh systems offered today have been designed to handle the problems encountered in the depths of larger cities where high rise buildings create a "concrete canyon" effect. When today's mesh nodes are deployed in such situations, much of the energy radiated from their omni-directional antennas is reflected and/or wasted. As will be shown in FIGS. 11 and 12, in such circumstances most of the energy radiated from a relay radio's omnidirectional antenna is directed at buildings, rather than down the street corridor to where other mesh nodes are located. Here, directional or sector antennas can offer significant advantages. Throughout this specification, directional and sector antennas are often used interchangeably. This is because they sometimes are interchangeable when one desires to focus the transmitted RF radiation, depending on just how narrow a beam is desired. In one sense, any antenna that is not "omnidirectional" can be considered "directional". However, among RF engineers, there is often a distinction between sector and directional antennas, as they differ to some extent. A sectoral or sector antenna has a horizontal beam angle that is measured in substantial portions of 180 degrees, most frequently, 90 degrees. They are often available with horizontal beam angles as small as 30 degrees, and one can think of them as covering a piece of the "360 degree pie", hence the term "sector". To focus the RF energy even more, a variety of types of "directional" antennas are available, usually with significantly higher gains. Directional antennas come in a variety of configurations referred to as "dish", "panel", "patch", or "reflector grid", to name a few. A 32 dBi dish antenna, for instance, would have both horizontal and vertical beam widths of 5 degrees, not something one would think of as covering a "piece of a pie" as with sector antennas.

Other factors involved in mesh node and mesh architecture design involve both the transmit power and cost of radio cards. The cost of radio cards for wireless networks is becoming increasingly lower, and although many of these have relatively low power, when combined with directional or sector antennas the EIRP (total transmitted power output from the antenna) can be more than acceptable, especially if utilized in a city deployment where the transmit energy can be focused in order to propagate between buildings, rather than wasted by transmitting into buildings.

SUMMARY

An interleaved mesh is described that uses at least two relay radios on each node to create two or more simultaneous mesh networks, each on separate channels. A transmitted stream of packets will then utilize any or all of these multiple simultaneous meshes as they propagate through the overall mesh network. For any particular hop, a packet may use any of the available meshes to propagate to the next node. From hop to hop, a particular packet may change which mesh it travels on to reach the next node. Here, two sequential packets in a particular packet stream may travel on the same mesh or on different meshes for any given hop. Two sequential packets can even be transmitted simultaneously from a first node to a second node. Thus, a single stream of sequential packets may be transmitted between two mesh nodes at twice the speed that would normally occur if only a single link were used, or even if multiple links were used but limited to propagating unique streams of packets separately on each link. Therefore, the performance of the highest priority packet stream will be improved regardless of whether traffic loading in the mesh is high or low at the time of transmission.

When two radios are used on a particular node for packet relay according to an interleaved mesh per this invention, data can be received on one radio while simultaneously being sent on the other radio. This circumvents the limitations of a single radio system without requiring complex channel management schemes, while at the same time providing a mesh that can easily operate without a server or internet connection—critically important for Public Safety applications when isolated First Responders are separated from their backhaul connection and must communicate among themselves.

To take advantage of the low cost of commonly available radio cards while compensating for their relatively low power and receive sensitivity, a mesh architecture is also described where a relatively large number of radios is used with multiple directional or sector antennas, or multi-element directional antennas, such that radiated energy is effectively focused. This is particularly useful in urban applications where the relay or backhaul path between nodes must travel between tall buildings, a narrow beam directional or sector antenna being most efficient for the task. This directional mesh architecture is designed as shown such that it is compatible with the interleaved mesh described earlier, thus facilitating a Public Safety mesh that supports both fixed nodes (with directional or sector antennas) and mobile nodes (with omni antennas) where the mobile nodes can be man-carried or mounted on vehicles.

Frequencies utilized include licensed bands for Public Safety applications and un-licensed bands for Public Service (Public Access) applications. Architectures are also shown that support both Public Safety applications and Public Service applications simultaneously.

In summary, one object of this invention is to increase performance when packets are relayed through the mesh by providing multiple radios on each node for the relay function. Here, two sequential packets in a particular packet stream may travel on the same mesh or on different meshes for any given hop.

Another object of this invention is to provide multiple radios on each mesh node without requiring a dynamic channel assignment scheme, and thereby utilizing simpler and more mature mesh management software.

Another object of this invention is to provide a more robust mesh architecture where redundant meshes are used between nodes, thereby maintaining an automatic backup path should any disturbance happen to one of the multiple mesh packet propagation paths.

Another object of this invention is to provide an alternative path for packets on a different channel should radar interference occur on one channel causing one of the multiple interleaved meshes to need to change channels, otherwise known as DFS or Dynamic Frequency Selection. Here, when radar interference occurs on a channel of a first mesh of the multiple meshes of an interleaved mesh network, traffic can continue to propagate on a second mesh while the first mesh changes to a different channel. This eliminates the gap in performance that occurs when a DFS change is executed on prior art meshes. Thus all nodes in the system are aware of the number of meshes available and the channels they each utilize.

Another object of this invention is to support mobile public safety mesh, while providing an increased level of performance over traditional mobile mesh with single radio relay.

Another object of this invention is to provide an architecture where multiple radios can be utilized at lower frequencies with higher penetration capabilities for certain public safety applications. Frequencies in the 700 MHz to 900 MHz range have great penetration and range capabilities, but are prone to adjacent channel interference. By using two interleaved meshes on greatly separated frequencies, these problems can be overcome and provide a 2-radio relay capability.

Another object to this invention is to support directional or sector antennas on fixed mesh nodes in an architecture which integrates seamlessly with mobile mesh nodes, and supports a multi radio relay on both fixed and mobile mesh nodes.

Another object of this invention is to support mobile mesh nodes with multiple radio relay capability that are able to operate independently as an isolated group, when such groups are isolated from a primary server or command and control connection.

Another object of this invention is to support fixed mesh nodes with multiple directional or sector antennas, where some radios on the same node connect to antennas facing in different directions and operating on the same channel, thus enabling communication with mobile nodes which simultaneously support multiple meshes on multiple radios. Also, utilizing radios and antennas operating on the same channel but facing in different directions on the same mesh node reduces the total number of channels required for the mesh. Reducing the total number of channels required for the mesh can also provide more available spectrum for technologies such as channel bonding which can further increase performance.

Another object of this invention is to support fixed mesh nodes with multiple directional or sector antennas, where some radios on the same node connect to antennas facing in different directions and operating on the same channel, and these radios operate independently but are controlled such that the actions of transmitting and receiving are coordinated to eliminate the possibility that one radio is attempting to receive while another radio on the same mesh node and same channel is transmitting, thereby eliminating the local co-channel interference which would otherwise result at that node.

Another object of this invention is to provide a mesh infrastructure with multiple radios that provides higher performance overall for video broadcast distribution and video multicast for video surveillance.

Another object of this invention is to provide multiple radios connected to multiple sector antenna structures, where individual sector antennas are "ganged" together as constructed to form a single antenna assembly.

Another object of this invention is to provide multiple groups of sector antennas where each group is "ganged" together, each gang of sector antennas being individually adjustable in both azimuth and elevation.

Another object of this invention is to provide an interleaved mesh architecture where WiMax radios could be utilized for the relay function as well as the service radio function for client access.

Another object of this invention is to provide an interleaved mesh architecture where MIMO radios and antennas could be utilized.

BRIEF DESCRIPTION OF THE DRAWINGS

The present invention is described with respect to particular exemplary embodiments thereof and reference is accordingly made to the drawings in which:

FIG. 3 shows example topologies and channel configurations in a WLAN Mesh from section 4.2.3 of IEEE 802.11-06/0328r0, the recently published Combined Proposal for the ESS Mesh Standard (March 2006).

DETAILED DESCRIPTION

The invention is illustrated by way of example and not by way of limitation in the figures of the accompanying drawings in which like references indicate similar elements. References to embodiments in this disclosure are not necessarily to the same embodiment, and such references mean at least one. While specific implementations are discussed, it is understood that this is done for illustrative purposes only. A person skilled in the relevant art will recognize that other components and configurations may be used without departing from the scope and spirit of the invention.

In the following description, numerous specific details are set forth to provide a thorough description of the invention. However, it will be apparent to those skilled in the art that the invention may be practiced without these specific details. In other instances, well-known features have not been described in detail so as not to obscure the invention.

One of the key components of the present invention is the new functionality herein called interleaved wireless mesh. In an interleaved mesh, at least two physical wireless mesh networks are utilized in parallel to propagate single streams of packets. In other words, a packet being transmitted from a mesh node will always have a choice of two or more meshes on which to propagate to the next mesh node, thus increasing the number of radios which can be simultaneously utilized to propagate a single packet stream. Note that a "packet stream" refers to a specific sequential stream of IP packets. Here, two sequential packets in a particular packet stream may travel on the same mesh or on different meshes for any given hop. Two sequential packets can even be transmitted simultaneously from a first node to a second node. Thus, a single stream of sequential packets may be transmitted between two mesh nodes at twice the speed that would normally occur if only a single link were used, or even if multiple links were used but limited to propagating unique streams of packets separately on each link. Therefore, the performance of the highest priority packet stream will be improved regardless of whether traffic loading in the mesh is high or low at the time of transmission.

Unlike prior art mesh networks with multi-radio relay architectures, the interleaved mesh does not require a complicated channel assignment scheme since typically each of the two meshes connecting to a given mesh node will always be on the same channels from hop to hop. Essentially, an interleaved mesh will utilize multiple, parallel physical meshes to act like a single logical mesh network.

Figure 5:
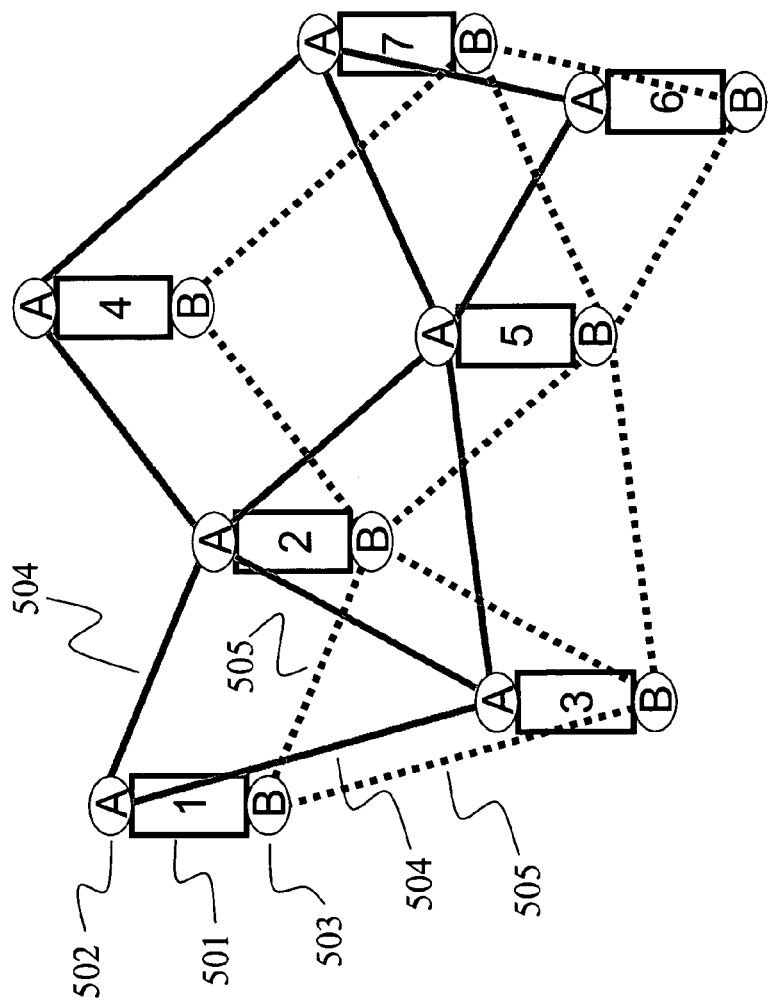
FIG. 5 shows one example of an interleaved wireless mesh network per the present invention, where each mesh node has at least two radios supporting at least two parallel mesh networks that are used in conjunction to propagate a single packet stream.

The basic architecture for interleaved mesh is most easily shown for an implementation where omnidirectional antennas are used and each mesh node has only two relay radios. This is demonstrated in FIG. 5 where mesh node 501 has two radios, radio 502 operating on a mesh which uses channel A and radio 503 operating on a mesh which uses channel B. Thus, radio 502 will make RF connections 504 on channel A to nodes 2 and 3, and radio 503 will make RF connections 505 on channel B to nodes 2 and 3. In this architecture all mesh nodes always have access to both mesh networks. As will be shown, the packet propagation scheme for an interleaved mesh relies on this fact, and both meshes are utilized to propagate a single packet stream. Since each relay radio in FIG. 5 is typically capable of connecting to all adjacent interleaved mesh nodes as shown, the concept of adjacency is important. For example, in FIG. 5, nodes 1, 3, 4, and 5 would all be considered as adjacent to node 2. Adjacent nodes are those with both physical position and connected RF signal strength so as to make a proper RF connection between them.

Figure 2:
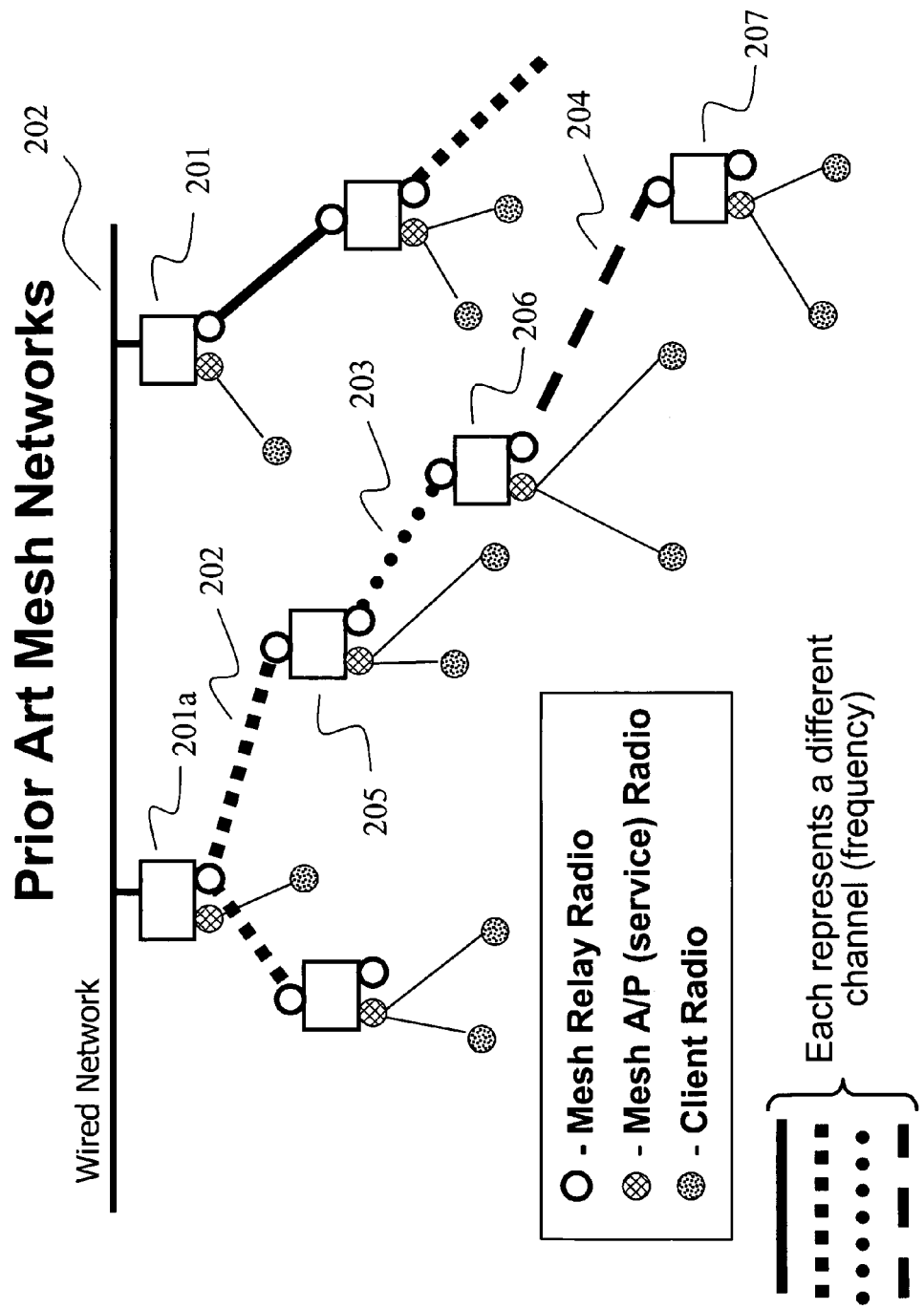
FIG. 2 shows a prior art "structured" mesh architecture with 2-radio relay in a 2-dimensional view.
Figure 4:
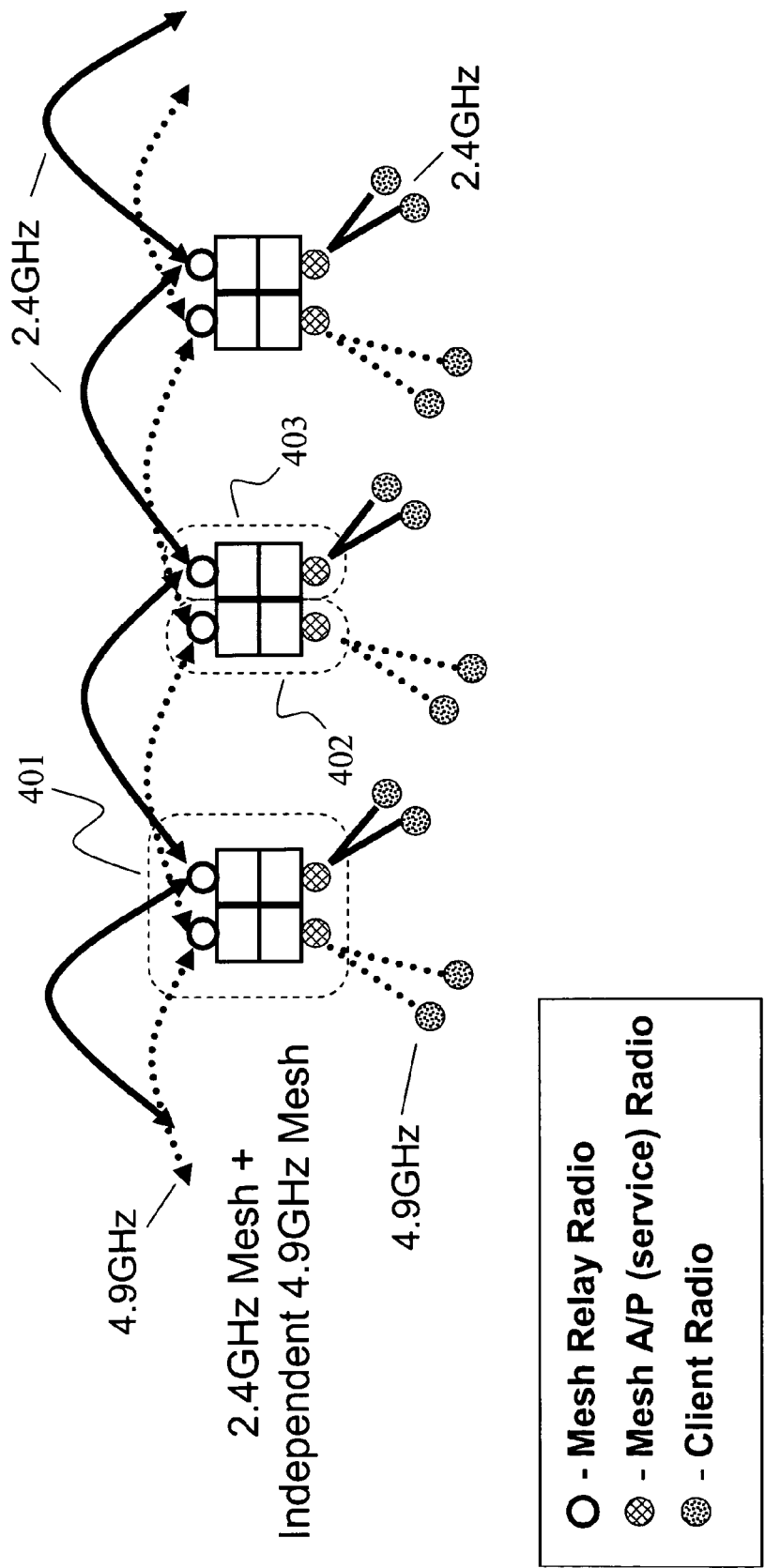
FIG. 4 shows a prior art mesh network which supports both public safety and public access by combining two separate mesh networks in one enclosure, each mesh network supported with one relay radio and a separate AP radio.

One benefit of having multiple, parallel meshes to propagate packets occurs when DFS (Dynamic Frequency Selection) is required to compensate for radar interference in certain frequency bands. Such a capability is required in a number of countries especially for the 5 GHz band. The European ETSI spec includes a required DFS capability. DFS provides an alternative path for packets on a second channel should radar interference occur on a first channel. The DFS specification as embodied in ETSI EN 301 893 v1.3.1 (August 2005) for the most part assumes a point to multipoint architecture where a single master device (at the hub) acts to control the slave devices relative to frequency channel utilization. However, the specification also states that devices capable of communicating in an ad-hoc manner shall also deploy DFS and should be tested against the requirements applicable to a master device according to the specification. For a conventional prior art mesh network, this means that if one mesh node detects interference on a particular frequency channel, it must notify all other mesh nodes that utilize that channel to change all communications currently operating on that channel to a different channel. For mesh networks with a single radio, single channel relay, this means that there will be an interruption in service during the "channel move time" which according to this specification can be as long as 10 seconds. An interruption of the just a few seconds can destroy a VoIP conversation and cause data losses where data streams back up and overflow data buffers. Even architectures such as that shown in FIG. 2 which include dynamic channel assignment, will have some data interruption while a number of links throughout the mesh are changed to alternate channels.

The interleaved mesh according to this invention handles DFS scenarios while maintaining a level of performance at least 50% as great as the maximum capability. When one of the multiple interleaved meshes according to this invention needs to change channels due to radar or other interference sources, the other mesh (or the others meshes if more than two parallel meshes are used) within the interleaved mesh architecture will continue to carry information during the "channel move time". Here, when radar interference occurs on the channel of a first mesh of the multiple meshes of an interleaved mesh network, a second mesh can be used to propagate the command which causes other nodes to change channels as well as propagate normal traffic while the first mesh changes to a different channel. This eliminates the gap in performance that occurs when a DFS change is executed on prior art meshes. In order to implement DFS as just described, it is important that all nodes in the system are aware of the number of meshes available and the channels they each utilize.

Figure 6:
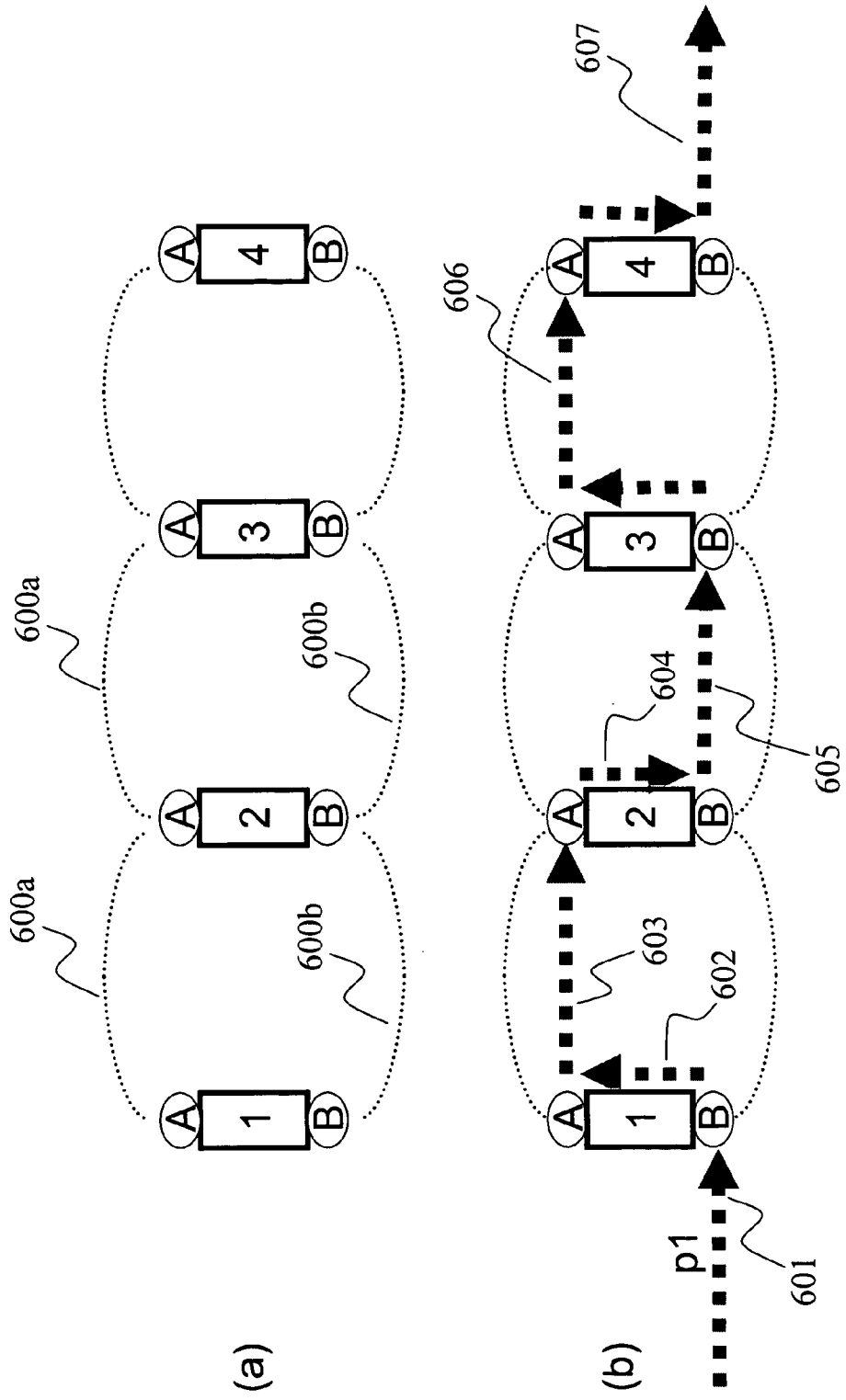
FIG. 6 shows the interleaved mesh network of the present invention, demonstrating how a single packet stream propagates by using both meshes, traveling on one or the other mesh for any given hop.

FIG. 6 shows a 1-dimensional architectural generalization for an interleaved wireless mesh according to this invention including a description for one scenario of packet propagation on an interleaved mesh. FIG. 6(*a*) shows four nodes, each supporting a wireless mesh 600(*a*) on channel A and another wireless mesh 600(*b*) on channel B. Omnidirectional antennas are assumed here. This four node mesh is shown here in basically a 1-dimensional "string of pearls" topology for sake of simplicity and clarity. It will be understood by those skilled in the art that all mesh networks described in this application can operate in a 2-dimensional mesh topology.

A possible packet propagation scheme for this interleaved mesh scenario is shown in FIG. 6(*b*) where a single packet p1 starts by entering 601 node 1 on the B-channel mesh. This same packet is then transferred 602 to the A-channel mesh from where it propagates 603 on the A-channel to node 2. The subject packet is then transferred 604 within node 2 back to the B-channel mesh, from where it propagates 605 to node 3. Thus, a single packet may bounce back and forth between one mesh and another mesh in a "ping-pong" or "interleaved" fashion as it propagates through the overall mesh network. At each of the four nodes shown, data can be received through either radio and if the other radio is currently free to transmit, then both radios on a node can be kept busy at the same time if interference effects allow (this will be discussed later). Other variations on packet propagation are possible and will be shown in more detail in FIGS. 8 and 10. Note that nodes with omnidirectional antennas (such as those shown in FIG. 6) can be utilized as mobile nodes, but it should also be apparent to those skilled in the art that such node configurations can be used in either fixed or mobile applications.

As a point of terminology, when a packet is transferred by RF transmission from one node to another, that transfer is referred to as a "hop". Thus, in FIG. 6, transmissions 601, 603, 605, 606, and 607 all constitute hops, and per the definition of an interleaved mesh per this invention, a single packet may travel on any of multiple physical meshes (in this case the A-channel mesh or the B-channel mesh) for any given hop, as it travels through the overall mesh network.

In a multi-hop wireless mesh network, routing paths are typically planned in a distributed manner, each node determining where it must send a packet in order to move that packet towards an eventual destination. Thus, each node makes a decision for each packet that assigns that packet to a particular routing path. It is therefore very useful if each node has knowledge of other nodes in the network and any constraints that may exist at other points in the network. In other words, if there is a particular node in the network which is currently experiencing bandwidth limitations or an unusual amount of congestion, it is important for other nodes in the system to know this in order to direct packets in a direction that may bypass the impediment. At the same time, if connections between nodes exist in some other area of the mesh where bandwidth is especially high or congestion especially low, this information can also be useful in directing packets along the most optimum routing path. Again it is useful for a particular node to have knowledge of other nodes and connections within the mesh. Therefore in the interleaved mesh network according to the present invention, it is useful for each node to understand which other nodes in the network also have interleaved multi-radio relay capability, in order to plan the most optimum routing path.

Figure 1:
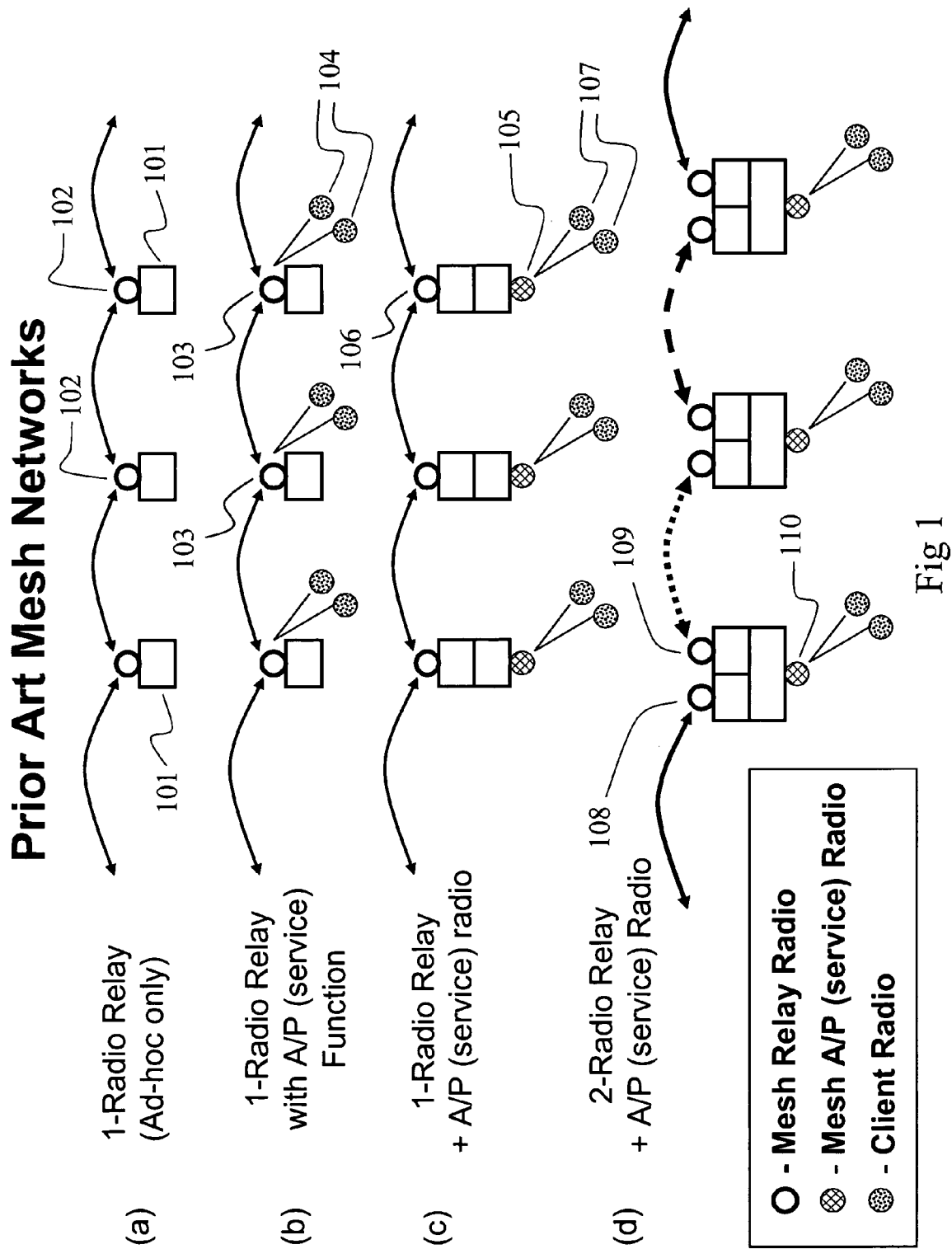
FIG. 1 shows a 1-dimensional view for a variety of prior art mesh network architectures, including both 1-radio relay and 2-radio relay.
Figure 7:
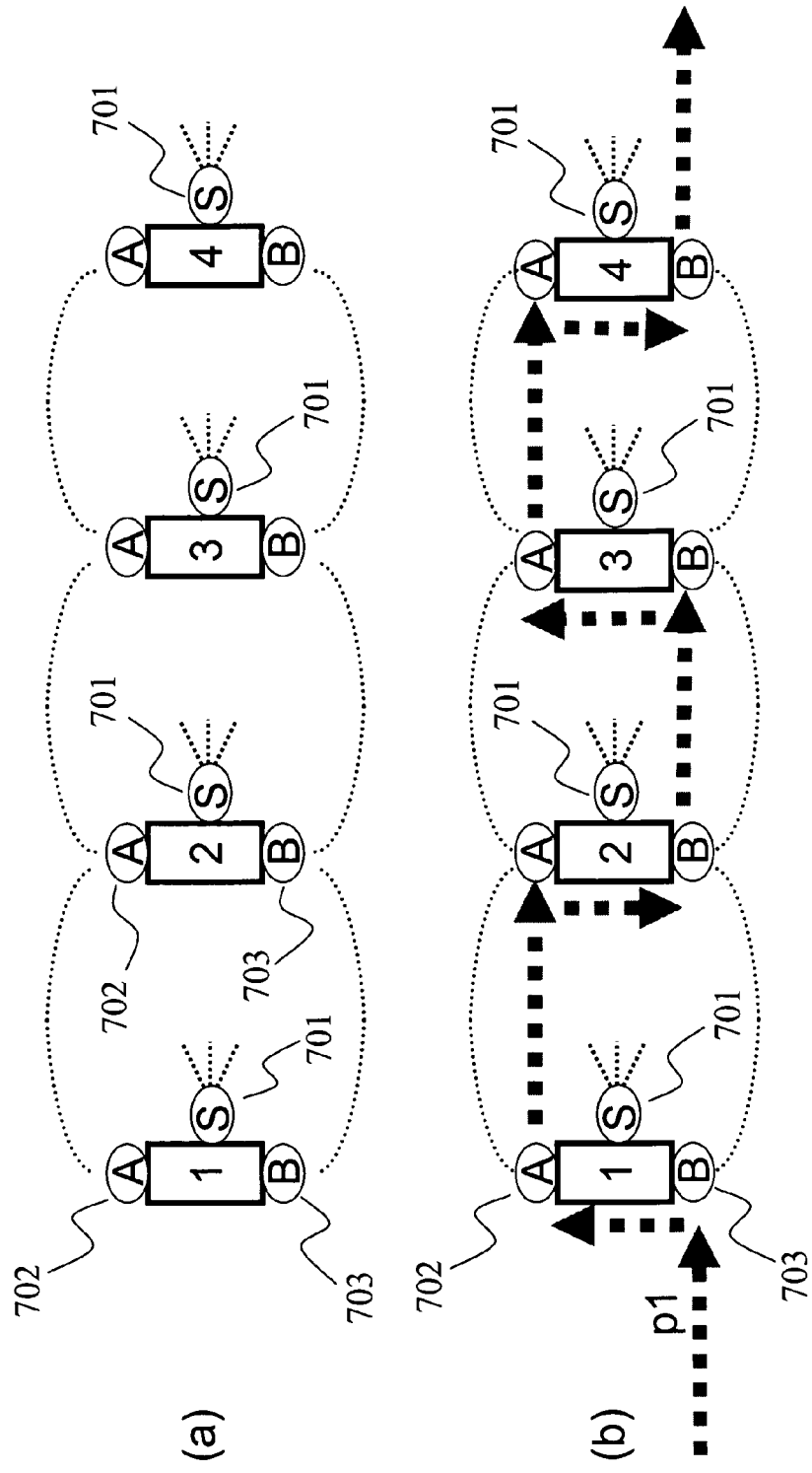
FIG. 7 shows the interleaved mesh network of FIG. 6 where a service or AP radio has been added, so that the mesh can communicate with client devices such as laptop computers independent of communications which happen on the relay radios.

FIG. 7 is essentially identical to FIG. 6 but adds the functionality of a service or AP (access point) radio 701 which has been added to each mesh node. As embodied in a variety of prior art mesh architectures including FIGS. 1(*c*) and (*d*), having a separate service radio enables the relay radios 702 and 703 to operate on different channels (frequencies) than the service radio. Also, having a separate service radio provides for simultaneous operation of relay and service radios thus increasing overall performance.

Figure 8:
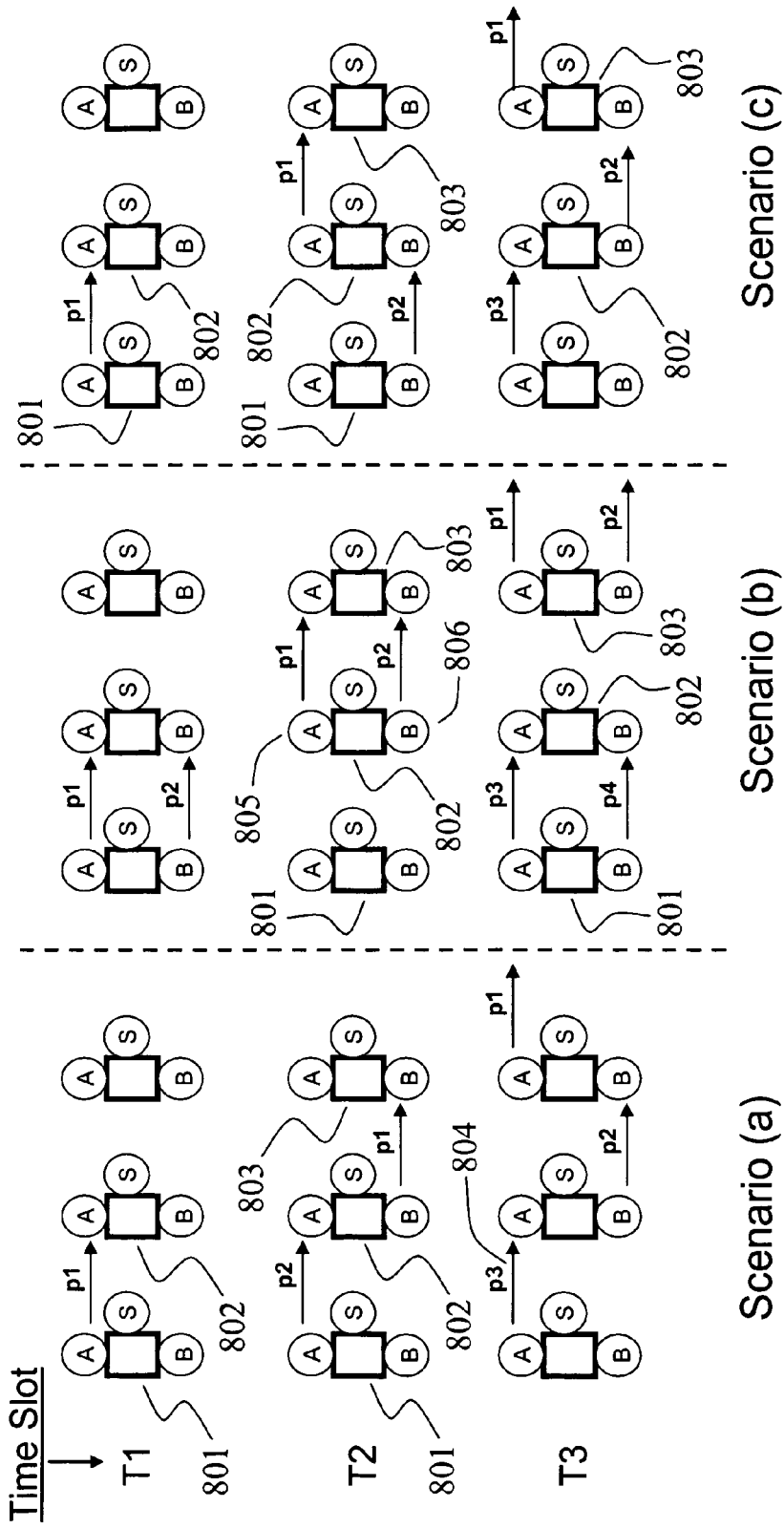
FIG. 8 shows some examples of how packets can propagate through an interleaved mesh, ignoring interference affects.

FIG. 8 shows examples of packet propagation scenarios through an interleaved or ping-pong mesh. Three scenarios are shown, (a), (b), and (c) for the propagation of sequential packets p1 through p4. For each scenario, packet propagation is shown for three sequential time slots, T1, T2, and T3. For the description of FIG. 8, adjacent node interference effects are temporary ignored to allow a simpler initial explanation of packet propagation. These effects will be explained in FIG. 9 and then incorporated into the packet propagation description in FIG. 10.

Timeslot T1 of scenario (a) in FIG. 8 shows packet p1 leaving node 801 and traveling to node 802 by way of the channel A mesh. Continuing scenario (a), timeslot T2 shows packet p1 progressing from node 802 to node 803, but this time propagating by way of the B-channel mesh. Concurrent with the propagation of packet p1 just described, packet p2 propagates from node 801 to node 802 on the A-channel mesh, thus demonstrating the ability of interleaved mesh nodes to simultaneously transmit and receive. Continuing scenario (a) further, timeslot T3 shows packet p1 and p2 progressing further, having "ping-ponged" to the opposite mesh, while packet p3 now enters the propagation stream 804 following p1 and p2 in sequence. Thus, it is also demonstrated that while packets in an interleaved or ping-pong mesh may travel on either of the multiple meshes for any given hop, the sequence of the packet stream is maintained such that the overall functionality is essentially the same as if only a single mesh had been used, except that performance has been increased due to simultaneity of transmission.

Scenario (b) of FIG. 8 demonstrates that sequential packets p1 and p2 may actually propagate simultaneously, each on a different mesh, even though in the packet stream, packet p1 precedes p2. Notice that in timeslot T2, packets p1 and p2 propagate simultaneously from node 802 to node 803, and that during this timeslot, no packets propagate from node 801 to node 802. This is due to the fact that the channel A and channel B radios 805 and 806 respectively cannot receive packets while they are transmitting packets. Subsequently in timeslot T3, packets p3 and p4 propagate simultaneously from node 801 to node 802, while packets p1 and p2 propagate simultaneously from node 803 onward.

Scenario (c) demonstrates that it is not required for a packet to utilize multiple meshes in the interleaved scheme. A packet can propagate solely on one mesh if the mesh control software in the various nodes decides that this is appropriate under the particular circumstances. This choice could relate to traffic patterns and also to interference effects. In timeslot T1 of scenario (c), packet p1 propagates from node 801 to node 802 via the A-channel mesh. In timeslot T2 of scenario (c), packet p1 further propagates from node 802 to node 803, also via the A-channel mesh. In timeslot T3 of scenario (c), packet p1 propagates beyond node 803 to another node in the mesh, also via the A-channel mesh.

As described above, it has been demonstrated that a sequential stream of packets can be propagated faster through an interleaved mesh architecture compared with architectures having a single radio relay structure. As dictated by the current traffic situation, two sequential packets may be propagated in sequence on one mesh of the multiple available interleaved meshes, or alternately these same two sequential packets may be propagated simultaneously on different meshes within the multiple available meshes. In certain embodiments, it is necessary that these sequential packets are delivered to their final destination in proper sequence and hence it may be necessary to provide a buffer memory on the receiving side such that when packets are transmitted in parallel and received out of sequence, the proper sequence can be restored. This restoration of the packet sequence is performed by the controlling software in the receiving node which upon examining the identification field in the IP header of each packet, determines the proper sequence of packets stored in the buffer. Thus, the multiple meshes within an interleaved mesh architecture according to this invention are able to propagate a stream of sequential packets at a rate at least double the rate of a prior art mesh with single radio relay capability.

Figure 9:
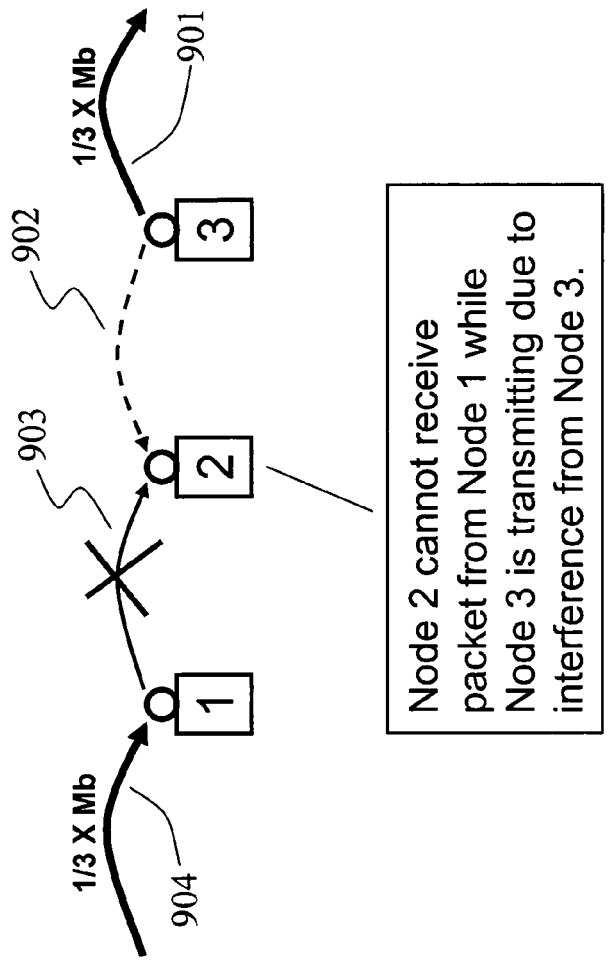
FIG. 9 shows how bandwidth degrades over a one radio relay as a result of adjacent node interference effects.

In reality, if omnidirectional antennas are used, the scenarios of FIG. 8 would look somewhat different when interference effects of adjacent nodes are further taken into account. These effects are described in more detail in FIG. 9. Here node 3 is transmitting 901 a packet to a node elsewhere on the mesh network, and while it is transmitting in this desired direction, as a result of using an omnidirectional antenna, the packet is also being transmitted in the opposite (undesired) direction 902 back towards node 2. Thus, while it would be desirable for node 2 to receive a packet from node 1 while node 3 is transmitting, such a packet transfer 903 is not possible and thus is shown with a "X" through it. As a result, node 1 is not able to transmit to node 2 but is able to receive 904 from some other node in the mesh network simultaneously with the transmission 901 from node 3. The result of this interference effect is that when examining a pipelined propagation of packets through a mesh with a 1-radio relay, only every third timeslot will actually propagate a packet, resulting in an actual propagated bandwidth of ⅓ that which the radios themselves are able to transmit and receive. Since this is a pipelined effect, after 4 hops the effect remains stable and the bandwidth degradation consistent. Of course most mesh installations are 2-dimensional topologies, not 1-dimensional as shown here for clarity. A 2-dimensional mesh will have further interference effects regardless of the architecture chosen. In the interleaved mesh according to this invention, much of this adjacent node degradation effect just described is offset by using multiple interleaved meshes to increase the simultaneity of packet propagation. In other words, by sending a packet stream simultaneously over two or more parallel meshes, the present invention can increase the overall effective propagation rate of a packet stream from the one third rate just described to a rate equal to two thirds or better of that which the radios themselves are able to transmit and receive. Note that the effect just described in FIG. 9 is the result of omnidirectional antennas which transmit in all directions, not just the desired direction. One object of this invention is to provide a directional mesh solution that provides packet propagation consistent with an interleaved mesh as described, but minimizes or eliminates the interference affects of FIG. 9 by implementing the interleaved mesh using directional or sector antennas (and sometimes additional radios) for fixed mesh installations where mesh nodes are more or less permanently mounted at a fixed location.

For mobile mesh applications such as police, fire department, and other first responders, as well as military applications, directional antennas are sometimes impractical and omnidirectional antennas must be utilized in spite of the limitations. Thus, FIG. 10 further describes packet propagation through an interleaved mesh specifically when omnidirectional antennas are utilized and adjacent node interference effects are present.

Figure 10:
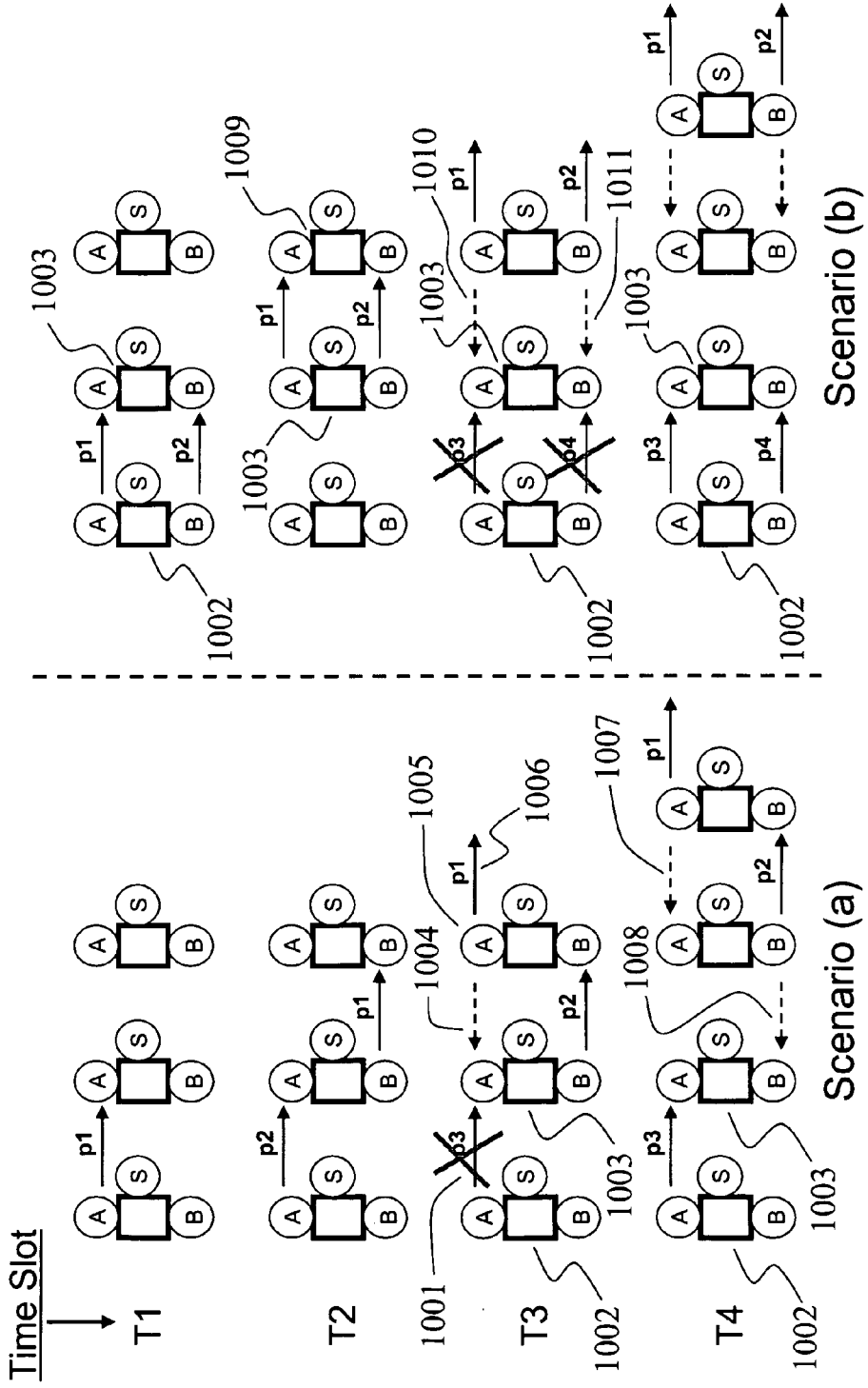
FIG. 10 shows some examples of how packets can propagate through an interleaved mesh once interference affects are taken into account.

For scenario (a) in FIG. 10, timeslots T1 and T2 show packet propagation similar to scenario (a) of FIG. 8. In timeslot T3, a packet is unable to be transmitted 1001 from node 1002 to node 1003 due to interference 1004 from A-channel radio 1005 attempting to transmit 1006 packet p1 onward through the mesh. Packet p3 is finally able to propagate from node 1002 to node 1003 during timeslot T4. Notice that interfering transmissions 1007 and 1008 during timeslot T4 further impede packet propagation.

Scenario (b) in FIG. 10 starts with packets P1 and P2 being transmitted simultaneously during timeslot T1 from node 1002 to node 1003 on meshes A and B respectively within the interleaved mesh. During timeslot T2, these packets propagate further from node 1003 to node 1009. During timeslot T3, it would be desirable for packets p3 and p4 to be transmitted from node will 1002 to node 1003, however this is prevented by interference radiations 1010 and 1011 resulting from the transmission of p1 and p2 as shown. Finally, in timeslot T4, packets p3 and p4 are able to propagate from node 1002 to node 1003. Note that in scenario (b) of FIG. 10, packets P1 and P2 are transmitted simultaneously even though they are adjacent sequential packets in a particular packet stream. Thus, this particular packet stream is able to propagate at twice the rate that it would in a system with a conventional single radio relay, thereby increasing effective propagation rate of a single packet stream to at least ⅔ of that which the radios themselves are able to transmit and receive, when two parallel meshes are used for an interleaved scenario. This performance level includes the interference effects described for FIGS. 9 and 10.

Figure 11:
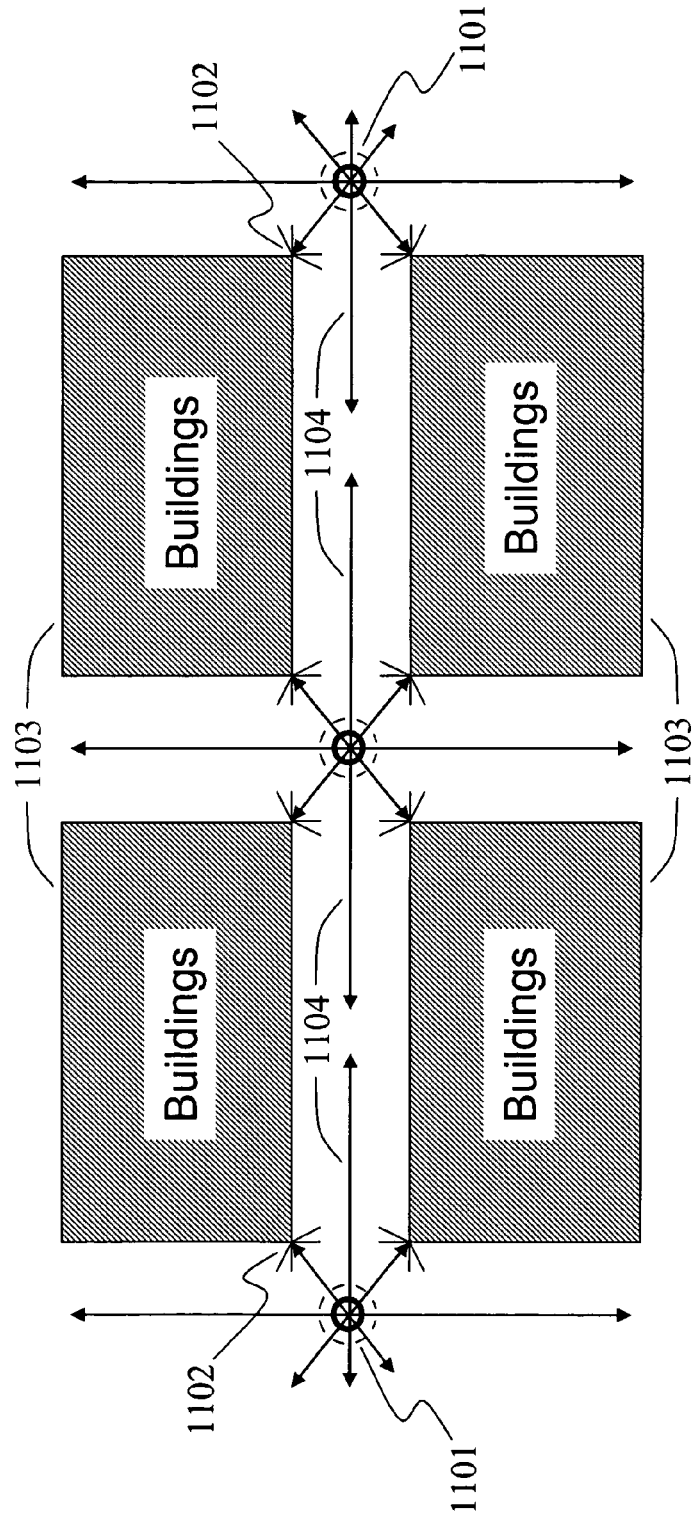
FIG. 11 shows a problem that results when omnidirectional antennas are used in a city with tall buildings.
Figure 12:
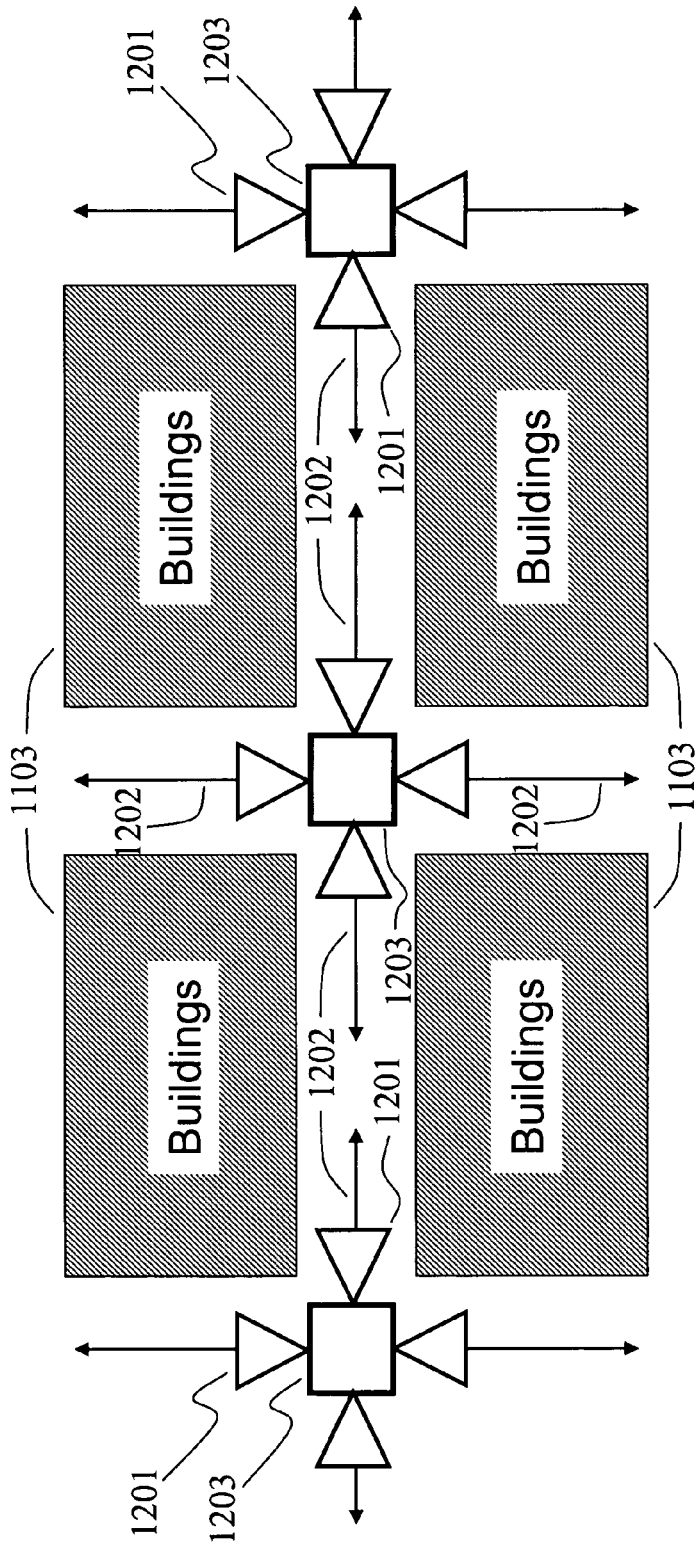
FIG. 12 shows a solution to the problem of FIG. 11 where multiple sector antennas are used to focus energy between tall buildings in a city.

FIGS. 11 and 12 relate to deployment issues for mesh in urban applications. Today, most mesh nodes that are deployed utilize omnidirectional antennas. In urban applications, especially when tall buildings are present, omnidirectional antennas 1101 used for mesh relay radios waste most of their radiated energy as the wasted energy impinges 1102 on buildings 1103. Only a small portion 1104 of the radiated energy from a relay radio is actually directed toward an adjacent mesh node.

FIG. 12 demonstrates how directional or sector antennas can be utilized to focus a relatively narrow beam of radiated energy 1202 traveling between buildings 1103 to implement the communications link between relay radios 1201 on adjacent mesh nodes 1203. As shown, each directional antenna can be adapted to have a horizontal beam width of less than 90 degrees. In this manner, each mesh node may cover less than the entire horizontal 360 degrees in order to focus and reduce the waste of radiation into certain unwanted directions. In some embodiments, each directional antenna can be focused to have a horizontal beam width of less than 45 or even less than 30 degrees so as to further increase effectiveness of the network.

A multitude of mesh nodes, such as those shown in FIG. 12, can be arranged in a rectangular grid formation so as to further simulate a real-world urban deployment. In one embodiment of such a formation, nodes which are diagonally positioned on the rectangular grid would be incapable of transmitting directly to each other, and would have to communicate via an intermediary adjacent node(s). On the other hand, nodes which are adjacent and vertically/horizontally positioned, can communicate directly to one another. The rectangular formation is well suited for deployment in metropolitan areas, for example, on the various street intersections. Furthermore, this rectangular grid can prevent or reduce the waste of radiated energy into buildings, as previously shown in FIG. 11, as well as increase the maximum possible distances between various mesh nodes due to the focus of the antenna beam.

Figure 13:
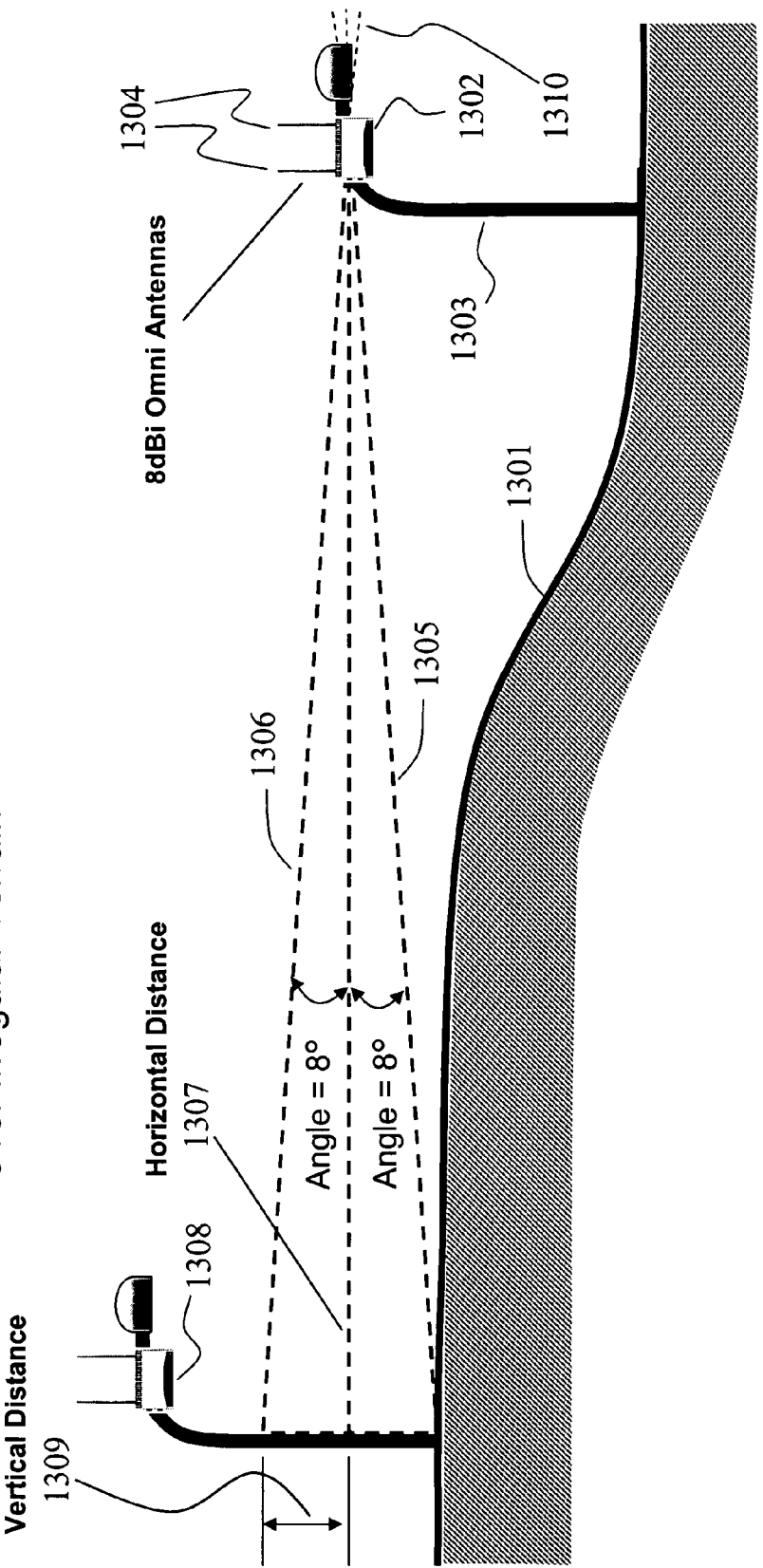
FIG. 13 shows a problem that results when omnidirectional antennas are used over irregular terrain.

FIG. 13 demonstrates another problem that results when using omnidirectional antennas for relay radios on mesh nodes. Here, the mesh is deployed over terrain 1301 which is irregular in elevation. Mesh node 1302 mounted on a light pole 1303 has antennas 1304 which have been mounted to be vertical (the 2 antennas shown on each node in this figure are for diversity and are actually driven by a single radio). Assuming these antennas have a 16° vertical beam angle this means that the radiation pattern would fit within an envelope that extends between 8° below horizontal 1305 and 8° above horizontal 1306. Depending on the horizontal distance 1307 between mesh node 1302 and an adjacent mesh node 1308, the vertical distance 1309 defining the vertical envelope of the radiation pattern from node 1302 as viewed at the location of node 1308 may be too small to allow the radiation pattern to reach mesh node 1308. As a result, node 1302 and node 1308 may be unable to communicate. If antennas 1304 on node 1302 were instead tilted to allow the upper edge 1306 of the radiation pattern to reach note 1308, radiation patterns 1310 from node 1302 emanating in the opposite direction would be automatically tilted towards the ground, and as a result would be unable to connect to other mesh nodes in the opposite direction.

Figure 14:
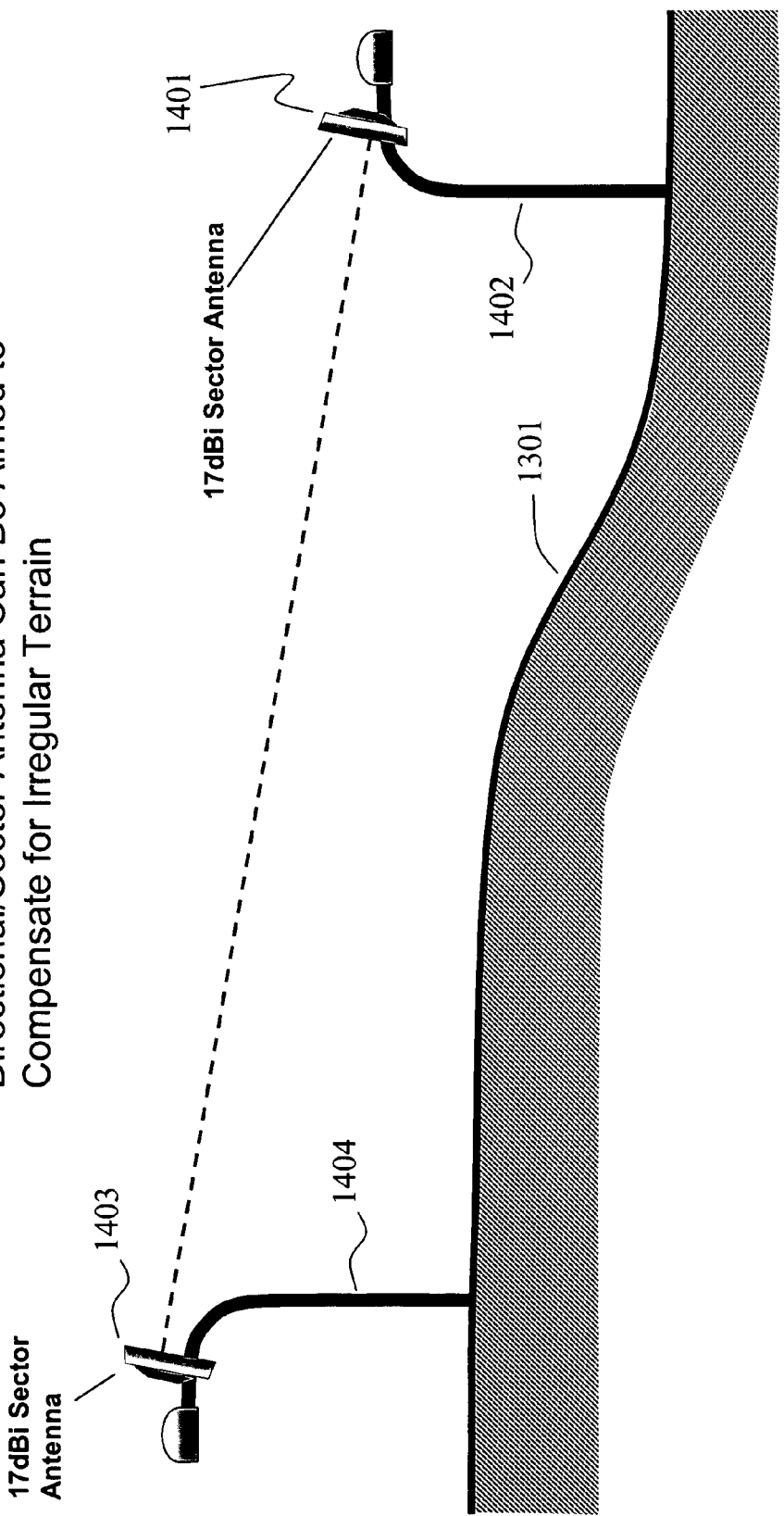
FIG. 14 shows a solution to the problem of FIG. 13 where sector antennas may be aimed in order to compensate for irregular terrain.

FIG. 14 shows how directional or sector antennas offer a solution to the problem of irregular terrain as demonstrated in FIG. 13. Here, sector antenna 1401 functions in conjunction with a relay radio connected to a mesh node on a light pole 1402. Antenna 1401 is adjustable for both azimuth and elevation enabling it to be vertically tilted to be aimed directly at antenna 1403 which is connected to a mesh node mounted on light pole 1404. Both antennas 1401 and 1403 are adjusted such that and they are aimed directly at each other thereby compensating for any variation in the elevation of terrain 1301. Note that additional sector antennas mounted on the same light poles can be aimed in other directions and adjusted differently for elevation in order to deal with further terrain irregularities.

Figure 15:
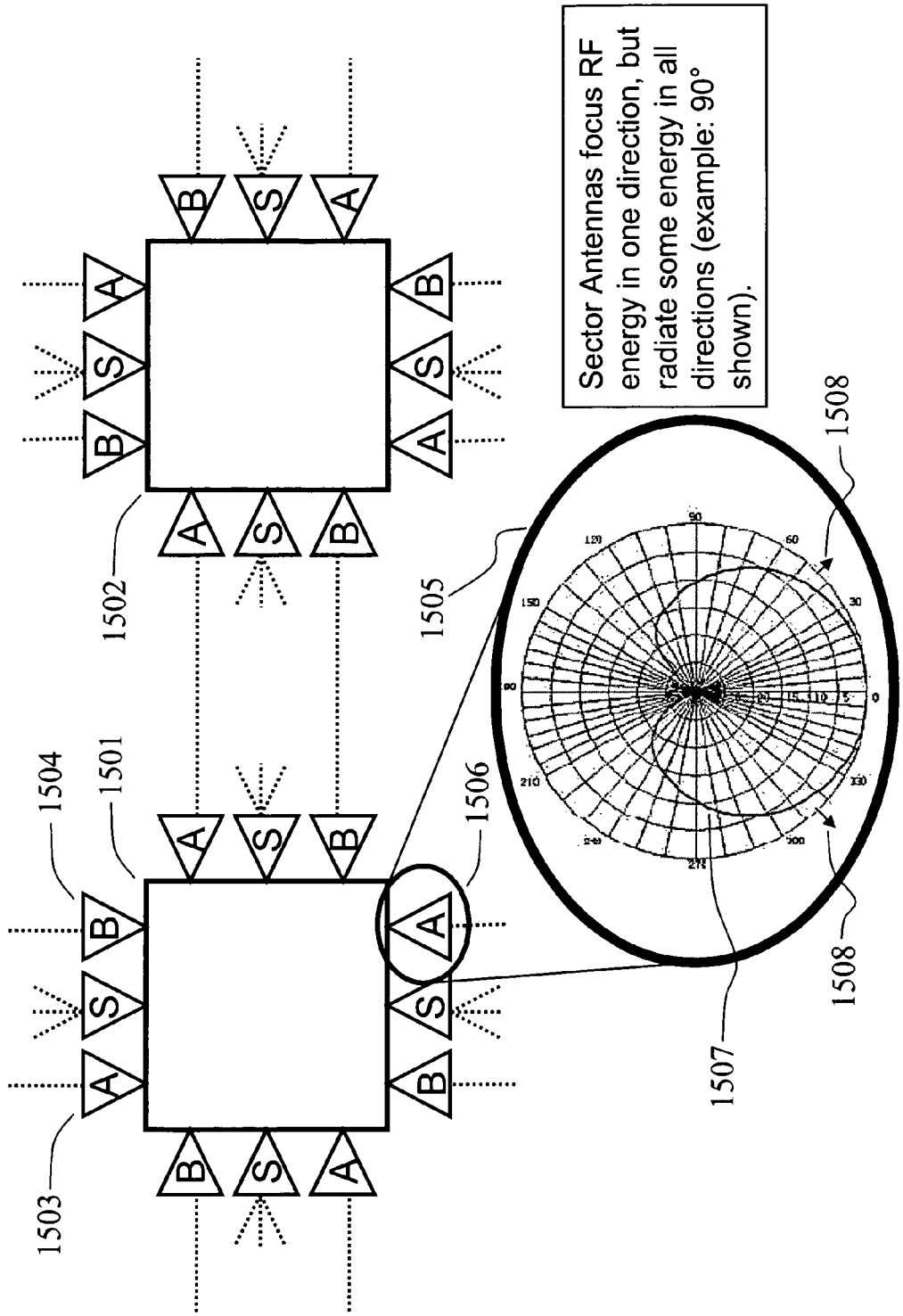
FIG. 15 shows an interleaved directional mesh where multiple sector antennas are used in different directions, and also shows the energy radiation pattern for a 90° sector antenna.

FIG. 15 shows two nodes 1501 and 1502 of a directional interleaved mesh according to this invention where multiple sector antennas are used in each of the four substantially orthogonal directions. (Note that where "orthogonal" is used in this specification to describe relative directionality, it means "substantially orthogonal" since there would typically be minor adjustments for azimuth and elevation of antennas to adjust for specific topological requirements.) Such nodes would be typically used in fixed locations within what would be typically called a fixed wireless mesh (as opposed to a mobile mesh). The channel assignments for the radios connected to each antenna are shown as letters within the antenna symbols such as A-channel antenna 1503 and B-channel antenna 1504. Notice that for each mesh node there is at least one antenna in each direction dedicated to channel A and another to channel B. This arrangement essentially replicates the interleaved mesh of FIG. 7 except that in each direction energy can now be focused more accurately. However if independent radios are connected to each of the antennas of mesh nodes 1501 and 1502, much higher performance is possible (due to simultaneity of transmit and receive) once solutions to the interference challenges have been implemented. A number of the figures that follow describe different strategies per the present invention for dealing with interference issues at a node, and provide varying degrees of increased performance. Regardless, note that in supporting both the A-channel mesh and the B-channel mesh of an interleaved mesh according to this invention, the fixed directional mesh nodes of FIG. 15 will communicate properly with mobile mesh nodes using omnidirectional antennas, should such mobile mesh nodes utilize the interleaved mesh architecture of FIGS. 5, 6, and 7.

Regarding the interference issues which arise once multiple antennas are placed in close proximity to one another and driven by radios operating on the same channel (co-channel operation), the enlargement 1505 of A-channel radio 1506 in FIG. 15 shows the horizontal radiation pattern 1507 typical of 90° sector antennas. Notice that the radiation pattern is reduced by 3 dB from its maximum at points 1508 which are 45° from the primary direction of the antenna. Also notice that even though most of the energy is focused in the primary direction, there is still considerable radiation throughout the remainder of the 180° span of the primary direction, and in fact some radiation is still present in a reverse direction. While this graph tends to indicate that little or no radiation is present directly opposite the primary direction, in fact most sector antennas have a specification called "front to back ratio" which is typically greater than 25 dB. However, even a signal that is 25 dB lower than the primary transmission may interfere with reception at other co-located antennas operating on the same channel depending on shielding and RF filtering characteristics. This explanation should therefore demonstrate why these co-channel interference issues should be addressed if fixed mesh nodes are to be constructed using multiple antennas with independent radios operating on the same channel.

Figure 16:
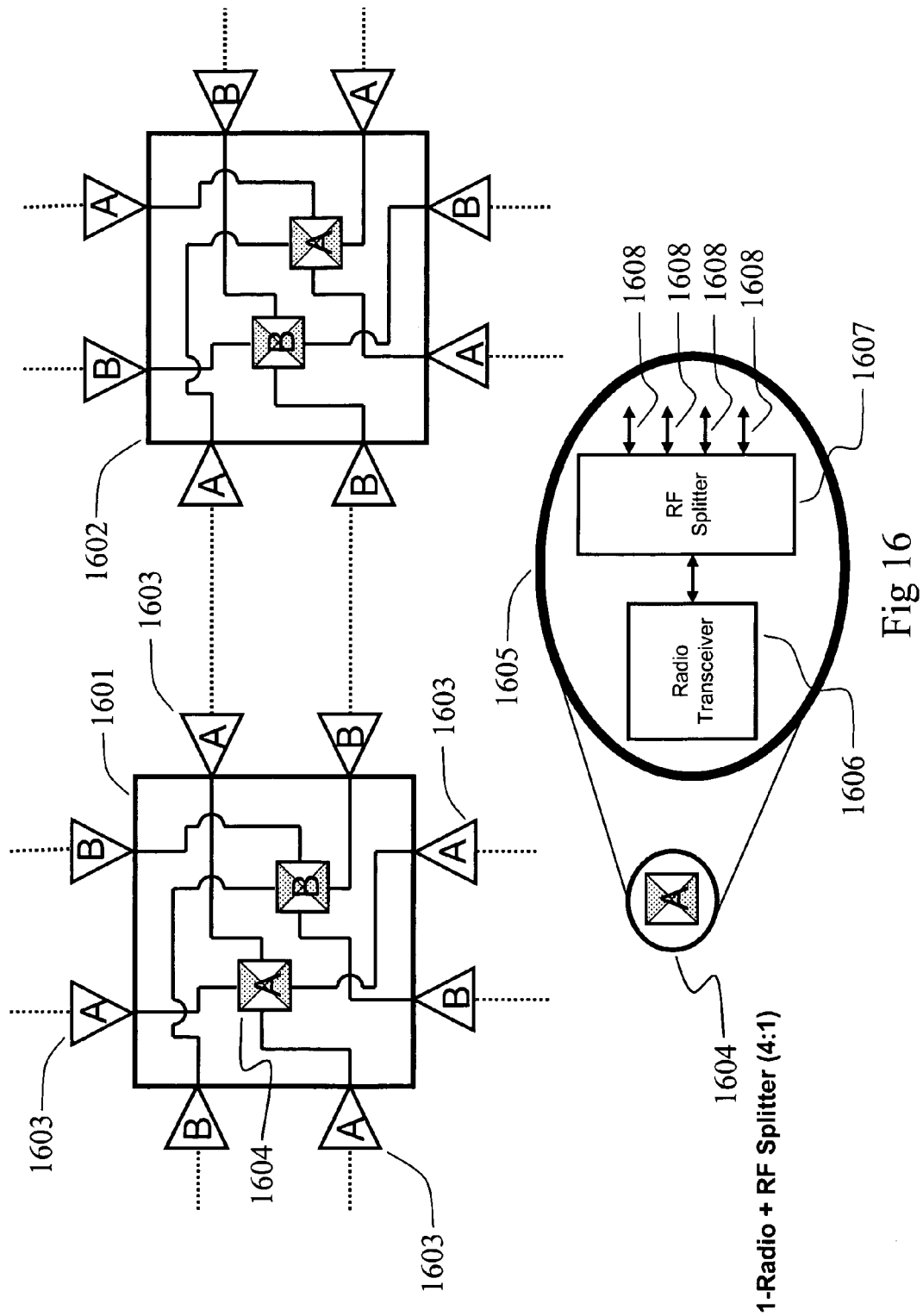
FIG. 16 shows an interleaved directional mesh where multiple sector antennas are used in different directions, and a single radio with a four-way (4:1) splitter is used to simultaneously drive four antennas which face in four substantially orthogonal directions.

FIG. 16 shows a variation on the directional mesh of FIG. 15 and solves the co-channel interference problem by ensuring that all antennas on the same node and assigned the same channel are either transmitting or receiving simultaneously. Mesh nodes 1601 and 1602 are similar to nodes 1501 and 1502 but include provision for all A-channel antennas 1603 on a particular node to be driven by a single common radio. This is accomplished by combination radio/splitter 1604 which is shown in greater detail in enlargement 1605 where radio transceiver 1606 feeds RF splitter 1607 which divides the RF energy into four outputs 1608, each of these outputs going to one of antennas 1603. In this manner the four common channel antennas 1603 function in unison as if they were an omnidirectional antenna. Depending upon the horizontal beam width of each antenna, there can be gaps in the horizontal radiation pattern if each sector antenna has a beam width angle of less than 90°. However, if each antenna is a 90° sector antenna, the four antennas 1603 will exactly cover 360°. In the urban environment however we know that such a distribution will cause the majority the energy to impinge on buildings and be wasted. Thus, in a dense urban environment each of antennas 1603 could be chosen to have a more narrow beamwidth, for instance 45° or even 30° or less, thereby focusing transmit energy in the direction of other mesh nodes to which packets are to be relayed.

Figure 17:
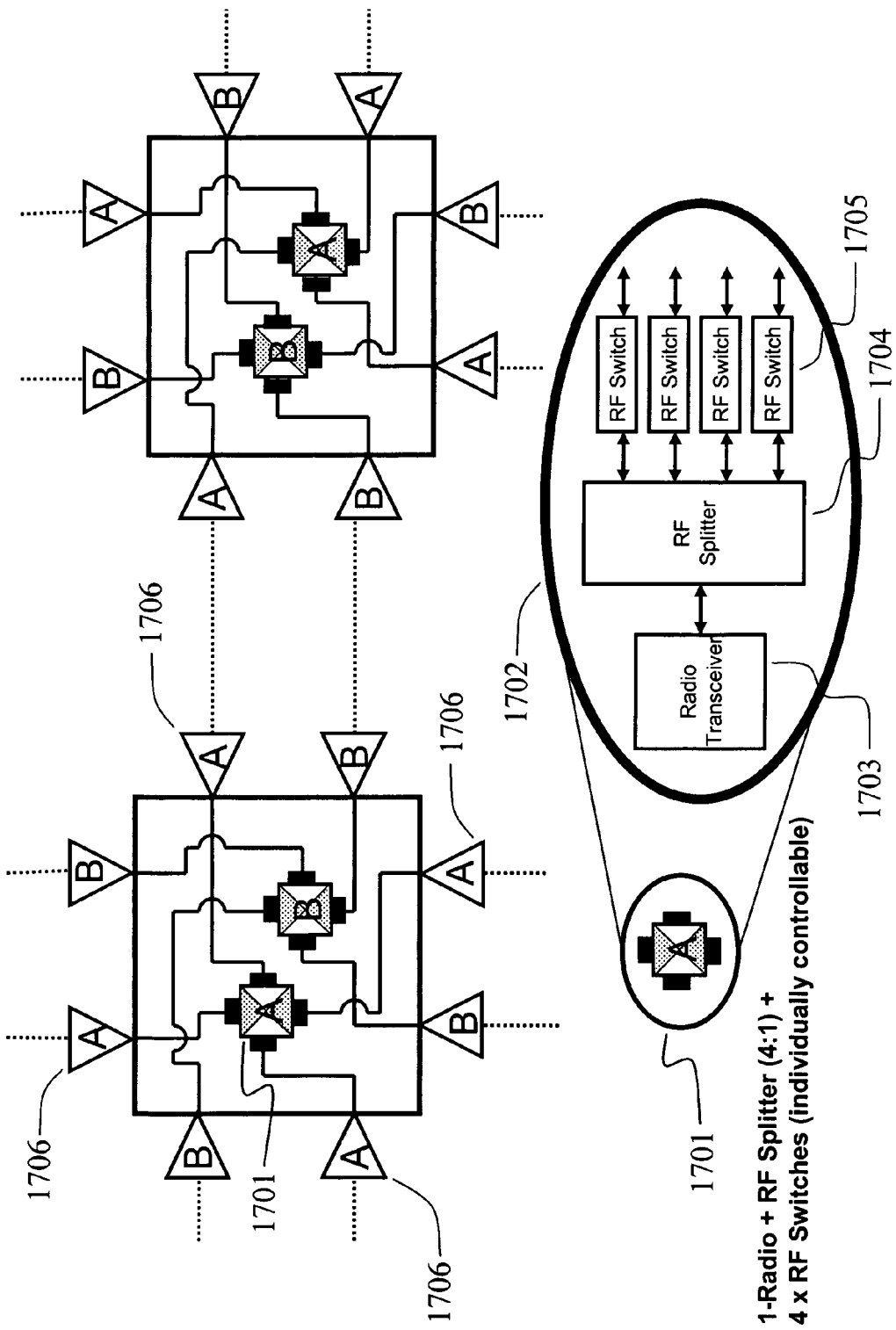
FIG. 17 shows an interleaved directional mesh where multiple sector antennas are used in different directions, and a single radio with a four-way (4:1) splitter is used to simultaneously drive four antennas which face in four substantially orthogonal directions, an independent RF switch being placed between each output of the four-way splitter and each of the four orthogonally directed sector antennas.

FIG. 17 shows a variation on the directional mesh node of FIG. 16 where individually controllable RF switches have been added as part of radio splitter combination 1701. Enlargement 1702 shows this combined functionality where radio transceiver 1703 feeds RF splitter 1704, the four outputs of which feed four individually controllable RF switches 1705 which in turn drive four common channel antennas 1706. The goal of this added functionality is to prevent the interference effect described in FIG. 9 from reducing performance of a mesh based on the node structure of FIG. 17. This is accomplished by controlling RF switches 1705 such that they only allow transmissions to pass when, in fact, it is desired to move packets in the specific direction associated with the particular antenna 1706. Thus, the adjacent node interference effect and degradation suffered by mesh architectures based on omnidirectional antennas and described in FIG. 9 will be avoided since the equivalent of transmission 902 in FIG. 9 will be blocked or prevented by a particular RF switch 1705.

Figure 18:
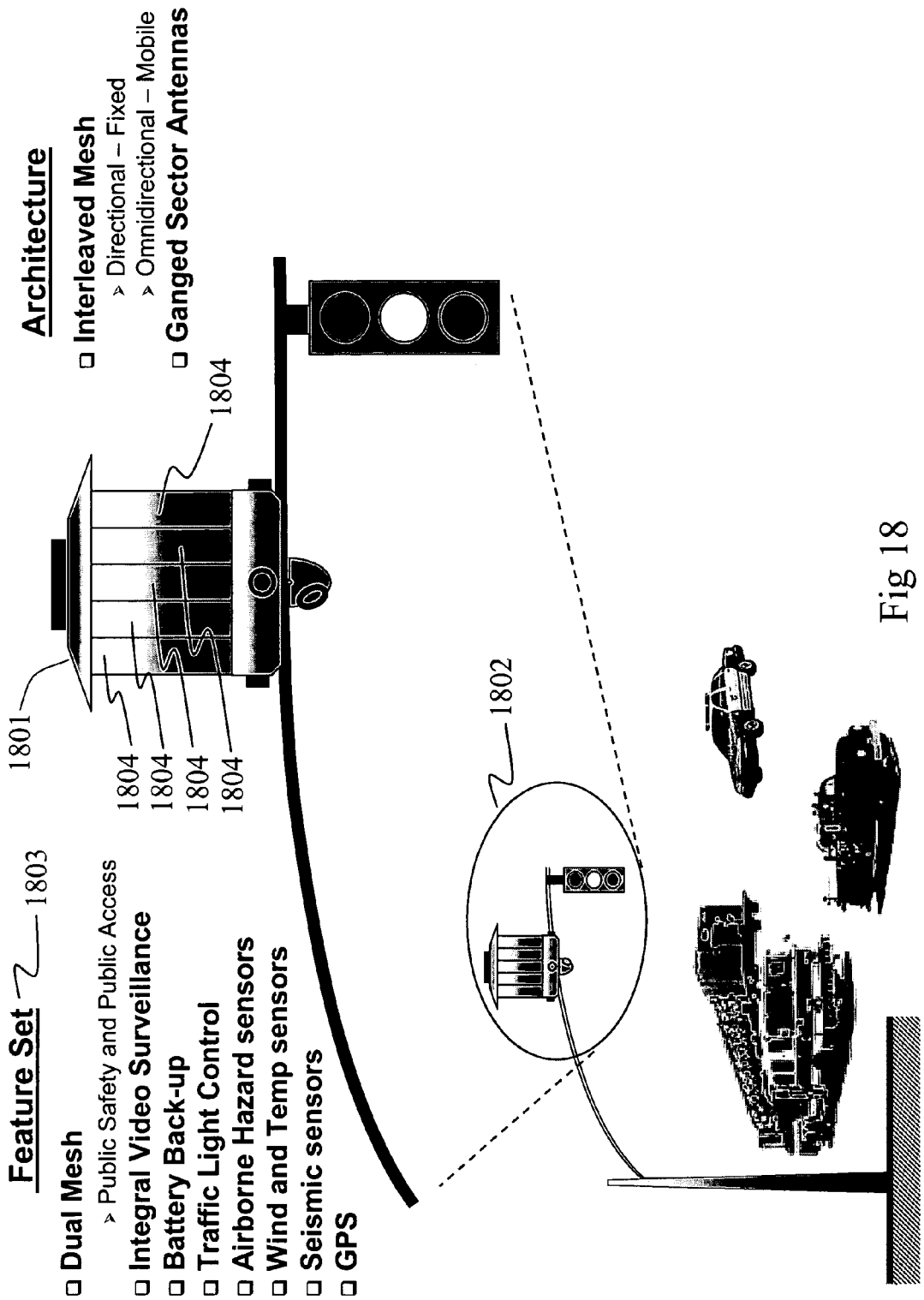
FIG. 18 shows a multi-function mesh node that supports both Public Safety and Public Access functions with a separate interleaved mesh for each. This fixed mesh node implements the directional mesh paradigm described herein with a "ganged antenna" approach, and also communicates with mobile nodes having omnidirectional antennas that also utilize the interleaved mesh paradigm. Also incorporated with the mesh node of FIG. 18, either integral with or attached thereto are various sensors for video surveillance and airborne hazardous materials as well as seismic and wind sensors, thereby enabling a grid of such mesh nodes to effectively form a comprehensive sensor network covering a metropolitan area.

FIG. 18 shows what fixed directional interleaved mesh node might look like in an actual real world installation. Here, such a mesh node 1801 is shown mounted at traffic intersection 1802. In addition to supporting WiFi service for general public access applications, such a mesh node can support a variety of public service capabilities such as those listed in feature set 1803, including, either integral with or attached to the node, various sensors for video surveillance and airborne hazardous materials as well as seismic and wind sensors. The inclusion of these and other appropriate public safety-related sensors enables a grid of such mesh nodes to effectively form a comprehensive sensor network covering a metropolitan area. Supported by a battery backup system, such a node can also control traffic signals in the event of an emergency situation where today, such traffic signals would cease to function.

As shown in FIG. 18, four groups of five sector antennas are utilized. Each group of sector antennas 1804 can be implemented as a gang of antennas which have a fixed relationship to each other and can be adjusted for azimuth and elevation in unison.

Figure 19:
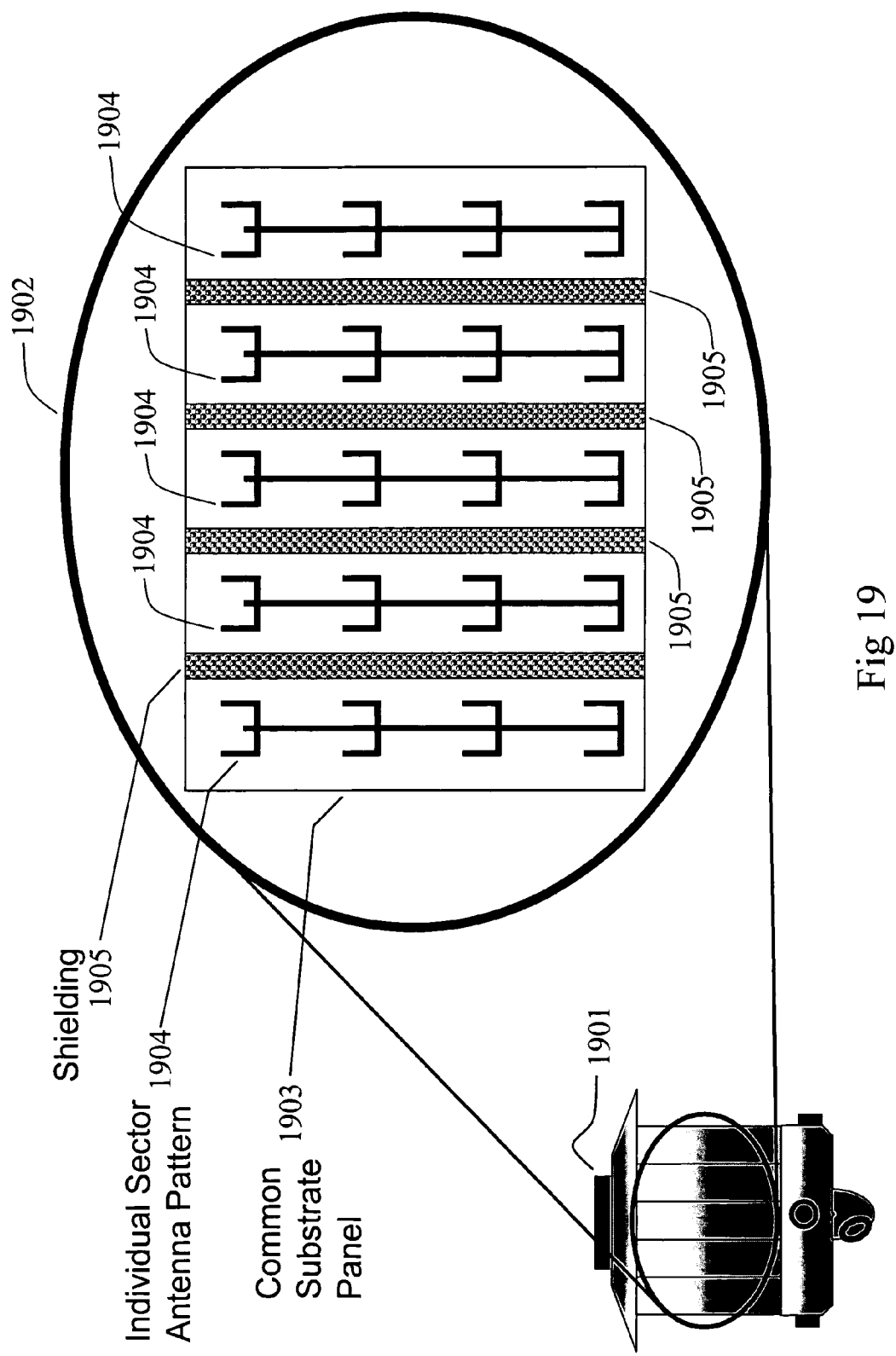
FIG. 19 shows a detailed picture of the ganged sectoral antenna array that can be used in the implementation of the directional mesh node of FIG. 18.

FIG. 19 shows fixed directional interleaved mesh node 1901 which is similar to mesh node 1801 of FIG. 18 and contains four ganged sector antennas, each antenna gang appearing as shown in enlargement 1902. Each antenna gang may be constructed on a common substrate panel 1903 which may consist of a standard printed circuit board (PCB) substrate material such as FR4 or other suitable material. Individual sector antenna conductor patterns can then be constructed simultaneously during the printed circuit board fabrication process to produce five individual antennas 1904 on one common PCB substrate 1903. Connections for shielding 1905 can be included in the conductor patterns created on PCB substrate 1903, and additional conductive material suitable for RF shielding can be mounted to PCB substrate 1903 at locations 1905 to provide additional shielding between individual antenna patterns 1904. In addition, other shielding measures can be provided within the overall enclosure of fixed mesh unit 1901 to further isolate each ganged sector antenna panel from the others in the enclosure. Note that to support MIMO (Multiple Input Multiple Output) radio-antenna combinations, the ganged antenna structure of FIG. 19 could be modified to include multiple antenna element patterns in place of each of patterns 1904 in FIG. 19.

Figure 20:
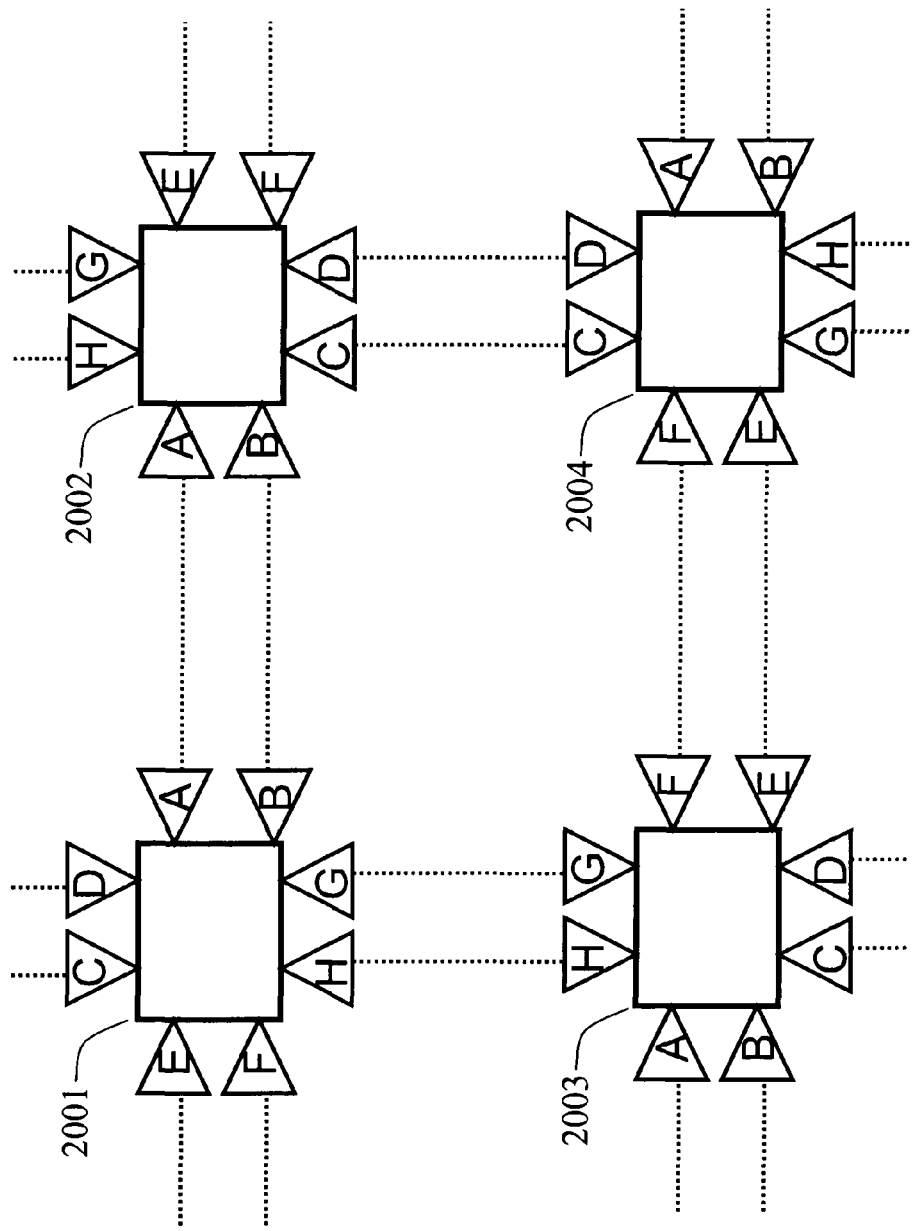
FIG. 20 shows a grid of mesh nodes where channels have been pre-assigned to eliminate co-channel interference on each mesh node, each individual radio on a fixed mesh node having a different channel from all other individual radios on that same node.

FIG. 20 shows another channel assignment strategy for a grid of fixed directional mesh nodes. As shown here, each node utilizes two radio-antenna combinations facing in each of four horizontally substantially orthogonal directions. Notice that nodes 2001 and 2004, which are positioned diagonally in the grid, have identical channel assignments as do nodes 2002 and 2003. For example, all radio-antenna combinations of node 2001 which are facing north, are assigned to communicate on the same respective channels as the radio-antenna combinations of node 2004 that also face north. In contrast with other embodiments of this disclosure, however, every radio on a given node in FIG. 20 has been assigned to operate on a different channel than all other radios of that same node. Thus, there may be no co-channel interference on any individual mesh node. FIG. 20 shows that, from the perspective of an individual node (such as 2001) in any given direction, there are always two radios available to transmit and receive packets thereby enabling an interleaved mesh architecture to be implemented. However, in other embodiments (not shown), each node need not necessarily be interleaved and can instead implement a single radio aimed in each direction. Furthermore, yet other embodiments may encompass three or more radios communicating on different channels and facing in the same direction. It is intended that the present invention cover all such embodiments.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. For example, steps preformed in the embodiments of the invention disclosed can be performed in alternate orders, certain steps can be omitted, and additional steps can be added. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalents.

What is claimed is:

1. An apparatus for wirelessly communicating signals between nodes in a wireless mesh network, the apparatus included in a first node of the wireless mesh network and comprising:
 a first directional antenna; and
 a relay radio configured to be coupled to the first directional antenna, the relay radio configured to be coupled to at least a second, third, and fourth directional antenna on the first node by way of a radio frequency (RF) splitter, wherein at least one of the first, second, third, and fourth directional antennas is configurable to be aimed in a substantially orthogonal direction relative to at least one other of the first, second, third, and fourth directional antennas, wherein coupled between each of the first, second, third, and fourth directional antennas and the RF splitter, is a respective first, second, third, and fourth RF switch, each configured to select via individual control of the respective single first, second, third, or fourth RF switch, for transmission of packets, a unique direction associated with a selected directional antenna of the first, second, third and fourth directional antennas.

2. The apparatus of claim 1 wherein each of the directional antennas is configured to communicate with at least one of four adjacent nodes to the first node of the wireless mesh network, the communication to occur on a common RF channel.

3. The apparatus of claim 1 wherein each of the directional antennas is adjusted in azimuth and elevation to adjust to a topological environment.

4. The apparatus of claim 1 wherein each of the directional antennas is configured to have a beamwidth of less than forty-five degrees.

5. The apparatus of claim 1 wherein the individual control of the respective single first, second, third, or fourth RF switch comprises selection of one of the first, second, third, or fourth RF switches without selecting one or more of the remaining first, second, third, or fourth RF switches in order to transmit the packets in the unique direction.

6. A system, comprising:
 a first relay radio included on a first node in an interleaved wireless mesh network, the first relay radio configured to be coupled to a first plurality of directional antennas via a first radio frequency (RF) splitter, wherein at least one of the directional antennas in the first plurality is aimed in a substantially orthogonal direction relative to at least one other directional antenna in the first plurality; and
 a second relay radio included on the first node and configured to be coupled to a second plurality of directional antennas via a second RF splitter, wherein at least one of the directional antennas in the second plurality is aimed in a substantially orthogonal direction relative to at least one other directional antenna in the second plurality of directional antennas, wherein a first, second, third, and fourth independently controllable RF switch is coupled between at least a respective first, second, third, and fourth directional antenna of the second plurality of directional antennas and the second RF splitter, each of the first, second, third, and fourth independently controllable RF switches configured to select via individual control of the single respective first, second, third, or fourth independently controllable RF switch, for transmission of packets, a specific direction associated with a selected directional antenna of the first, second, third or fourth directional antenna.

7. The system of claim 6 wherein the first relay radio and the second relay radio are configured to make RF connections to respective first and second relay radios of a second node.

8. The system of claim 6 wherein the first relay radio and the second relay radio provide alternative paths for receiving packets on the first node and transmitting packets from the first node.

9. The system of claim 6 wherein the directional antennas are configured to have a horizontal beam width angle of less than 90 degrees.

10. The system of claim 6 wherein the interleaved wireless mesh network including the first node includes a least four mesh nodes arranged in a substantially rectangular grid formation.

11. The system of claim 10 wherein a first mesh node of the rectangular grid formation is configured to transmit directly to a mesh node other than one aligned diagonally from the first mesh node.

12. The system of claim 6, further comprising a third plurality of directional antennas, the third plurality of antennas implemented as a gang of antennas.

13. The system of claim 12, wherein the third plurality of directional antennas has a fixed relationship to the second plurality of directional antennas and can be adjusted for azimuth and elevation in unison.

14. A method for receiving and transmitting packets in an interleaved wireless mesh network including a plurality of nodes, said method comprising:
 receiving a stream of packets on a first RF channel at a first radio of a first node in the interleaved wireless mesh network, the first radio coupled to a first, second, third, and fourth directional antenna, wherein a first, second, third, and fourth independently controllable RF switch is coupled between each of the respective first, second, third, and fourth directional antennas and the first radio; and
 transmitting the stream of packets on a second RF channel from a second radio, the second radio coupled to a respective fifth, sixth, seventh, and eighth directional antenna by way of an RF splitter, wherein coupled between each of the fifth, sixth, seventh, and eighth directional antennas and the RF splitter is each of a respective fifth, sixth, seventh, and eighth individually-controllable RF switch, each configured to select a unique direction associated with a single selected antenna of the fifth, sixth, seventh, and eighth directional antenna for transmission of the stream of packets.

15. The method of claim 14 further comprising monitoring additional nodes in the interleaved wireless mesh network to detect available nodes for transmitting and/or receiving the stream of packets.

16. The method of claim 14 wherein the stream of packets are received from an adjacent second node included in a grid of four nodes in the interleaved wireless mesh network.

17. The method of claim 16 wherein the first node and the adjacent second node each include two radio-antenna combinations facing in each of four horizontally substantially orthogonal directions.

18. The method of claim 17 wherein within the grid of four nodes, each of two nodes positioned diagonally in the grid from each other include identical channel assignments for each of the radios similarly positioned on each of the two nodes.

19. The method of claim 18 wherein each radio of a given node is assigned to operate on a different channel than each other radio of the given node.

20. The method of claim 14 wherein the first node includes a plurality of ganged sector antennas, each antenna gang constructed on a printed circuit board substrate.

* * * * *

UNITED STATES PATENT AND TRADEMARK OFFICE
CERTIFICATE OF CORRECTION

| | | |
|---|---|---|
| PATENT NO. | : 8,102,868 B2 | |
| APPLICATION NO. | : 11/507921 | |
| DATED | : January 24, 2012 | |
| INVENTOR(S) | : Osann, Jr. | |

It is certified that error appears in the above-identified patent and that said Letters Patent is hereby corrected as shown below:

Column 17, line 54, in Claim 4, delete "beamwidth" and insert -- beam width --.

Column 18, line 32, in Claim 10, delete "a least" and insert -- at least --.

Column 18, line 39, in Claim 12, delete "claim 6," and insert -- claim 6 --.

Column 18, line 42, in Claim 13, delete "claim 12," and insert -- claim 12 --.

Signed and Sealed this
Tenth Day of July, 2012

David J. Kappos
*Director of the United States Patent and Trademark Office*